United States Patent
Artail et al.

(10) Patent No.: US 11,267,457 B2
(45) Date of Patent: Mar. 8, 2022

(54) SYSTEMS AND METHODS FOR MANAGING ELECTRIC MOTOR TORQUES IN A HYBRID ELECTRIC VEHICLE

(71) Applicant: Ford Global Technologies, LLC, Dearborn, MI (US)

(72) Inventors: Abdalla Artail, Dearborn, MI (US); Bader M. Badreddine, Dearborn Heights, MI (US); Susan Rebecca Cikanek, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 16/708,022

(22) Filed: Dec. 9, 2019

(65) Prior Publication Data
US 2021/0171015 A1  Jun. 10, 2021

(51) Int. Cl.
*B60W 20/50* (2016.01)
*B60L 3/00* (2019.01)
(Continued)

(52) U.S. Cl.
CPC .............. *B60W 20/50* (2013.01); *B60K 1/02* (2013.01); *B60L 3/003* (2013.01); *B60L 7/18* (2013.01);
(Continued)

(58) Field of Classification Search
CPC ............... B60W 20/40; B60W 20/50; B60W 2050/021; B60W 30/18127; B60L 3/003;
(Continued)

(56) References Cited

U.S. PATENT DOCUMENTS 5,376,868 A * 12/1994 Toyoda ............... B60L 15/20
                                        318/587
7,739,005 B1 * 6/2010 Tang ................. B60L 15/2036
                                        701/22
(Continued)

FOREIGN PATENT DOCUMENTS

JP        2007331559 A  * 12/2007
JP        2008228361 A  *  9/2008
(Continued)

OTHER PUBLICATIONS

Mutoh, Nobuyoshi et al., "Driving Characteristics of an Electric Vehicle System With Independently Driven Front and Rear Wheels", IEEE Transactions on Industrial Electronics, vol. 53 No. 3, Jun. 2006, pp. 803 to 813 (Year: 2006).*

(Continued)

*Primary Examiner* — David A Testardi
(74) *Attorney, Agent, or Firm* — David Kelley; McCoy Russell LLP

(57) ABSTRACT

Methods and systems are provided for propelling a hybrid electric vehicle under circumstances where a torque degradation event associated with an electric machine that is used for propulsive effort is indicated. In one example, a method may include propelling the vehicle at least in part via a first electric machine that provides torque to front wheels and/or via a second electric machine that provides torque to rear wheels of the vehicle, and continuing to propel the vehicle via adjusting operation of both the first and the second electric machine in response to an indication of a torque degradation event associated with one of the electric machines. In this way, a vehicle shutdown event may be avoided.

16 Claims, 10 Drawing Sheets

(51) Int. Cl.
*B60W 20/40* (2016.01)
*B60L 15/20* (2006.01)
*B60K 1/02* (2006.01)
*B60L 7/18* (2006.01)
*B60L 53/22* (2019.01)
*B60W 10/08* (2006.01)
*B60W 10/06* (2006.01)

(52) U.S. Cl.
CPC ............ *B60L 15/2009* (2013.01); *B60L 53/22* (2019.02); *B60W 20/40* (2013.01); *B60L 2210/30* (2013.01); *B60L 2210/40* (2013.01); *B60W 10/06* (2013.01); *B60W 10/08* (2013.01)

(58) Field of Classification Search
CPC .. B60L 3/0061; B60L 3/0092; B60L 2220/42; B60L 2220/44; B60L 2260/28; H02M 1/32; H02M 1/325; H02P 29/028; B60K 6/52; B60T 2270/604
See application file for complete search history.

(56) References Cited

U.S. PATENT DOCUMENTS

| | | | |
|---|---|---|---|
| 9,604,526 B2 | 3/2017 | Gauthier et al. | |
| 2002/0180266 A1* | 12/2002 | Hara | B60L 7/12 303/152 |
| 2004/0176899 A1* | 9/2004 | Hallowell | B60K 23/0808 701/84 |
| 2004/0263099 A1* | 12/2004 | Maslov | B60L 15/20 318/400.24 |
| 2007/0138986 A1* | 6/2007 | Kutsuna | B60L 3/0084 318/400.21 |
| 2009/0255744 A1* | 10/2009 | Kitano | B60W 10/06 180/65.285 |
| 2011/0095603 A1* | 4/2011 | Lee | B60L 50/51 307/10.1 |
| 2012/0330484 A1* | 12/2012 | Martin | B60L 7/18 701/22 |
| 2013/0173100 A1* | 7/2013 | Takagi | B60L 50/51 701/22 |
| 2013/0311034 A1 | 11/2013 | Falkenstein | |
| 2014/0062348 A1* | 3/2014 | Isayeva | B60L 3/0061 318/139 |
| 2014/0062349 A1* | 3/2014 | Isayeva | B60W 20/50 318/139 |
| 2014/0067173 A1* | 3/2014 | Isayeva | B60W 50/035 701/22 |
| 2014/0195097 A1* | 7/2014 | Yamanaka | B60L 50/16 701/29.1 |
| 2014/0346985 A1 | 11/2014 | Magne et al. | |
| 2015/0069832 A1* | 3/2015 | Yamane | B60L 50/51 307/10.1 |
| 2015/0097426 A1* | 4/2015 | Yamane | B60L 3/0092 307/10.1 |
| 2015/0155816 A1* | 6/2015 | Saito | H02M 1/08 318/139 |
| 2015/0175010 A1* | 6/2015 | Tang | H02P 29/032 701/22 |
| 2016/0018287 A1* | 1/2016 | Syed | G01M 15/044 73/114.15 |
| 2017/0334437 A1* | 11/2017 | Mikami | B60K 6/448 |
| 2018/0043881 A1* | 2/2018 | Hirasawa | B60W 20/50 |
| 2018/0312146 A1* | 11/2018 | Lian | B60T 8/171 |
| 2020/0317059 A1* | 10/2020 | Mikami | B60L 3/003 |

FOREIGN PATENT DOCUMENTS

| | | | | |
|---|---|---|---|---|
| JP | 2010200426 A | * | 9/2010 | ............ B60L 3/0092 |
| JP | 2011254589 A | * | 12/2011 | ................ B60L 7/18 |
| JP | 2013193523 A | * | 9/2013 | ................ B60L 7/18 |
| JP | 2014103709 A | * | 6/2014 | ............ B60L 3/0092 |
| JP | 2014125053 A | * | 7/2014 | |
| JP | 2019187061 A | * | 10/2019 | |

OTHER PUBLICATIONS

EPO machine translation of JP 2007-331559 (original JP document published Dec. 27, 2007) (Year: 2007).*

Mutoh, Nobuyoshi et al., "Failsafe Control Methods for EVs with the Failsafe Structure Driven by Front and Rear Wheels Independently", The World Electric Vehicle Association Journal, WEVA Journal (WEVJ), MDPI (Switzerland), vol. 1, 2007, ISSN 2032-6653, pp. 271 to 278 (Year: 2007).*

EPO machine translation of JP 2008-228361 (original JP document published Sep. 25, 2008) (Year: 2008).*

Mutoh, Nobuyoshi et al., "Front-and-rear-wheel-independent-drive type electric vehicle (FRID EV) with the outstanding driving performance suitable for next-generation advanced EVs," 2009 IEEE Vehicle Power and Propulsion Conference, 2009, pp. 1064-1070 (Year: 2009).*

EPO machine translation of JP 2011-254589 (original JP document published Dec. 15, 2011) (Year: 2011).*

EPO machine translation of JP 2014-103709 (original JP document published Jun. 5, 2014) (Year: 2014).*

* cited by examiner

FIG. 1
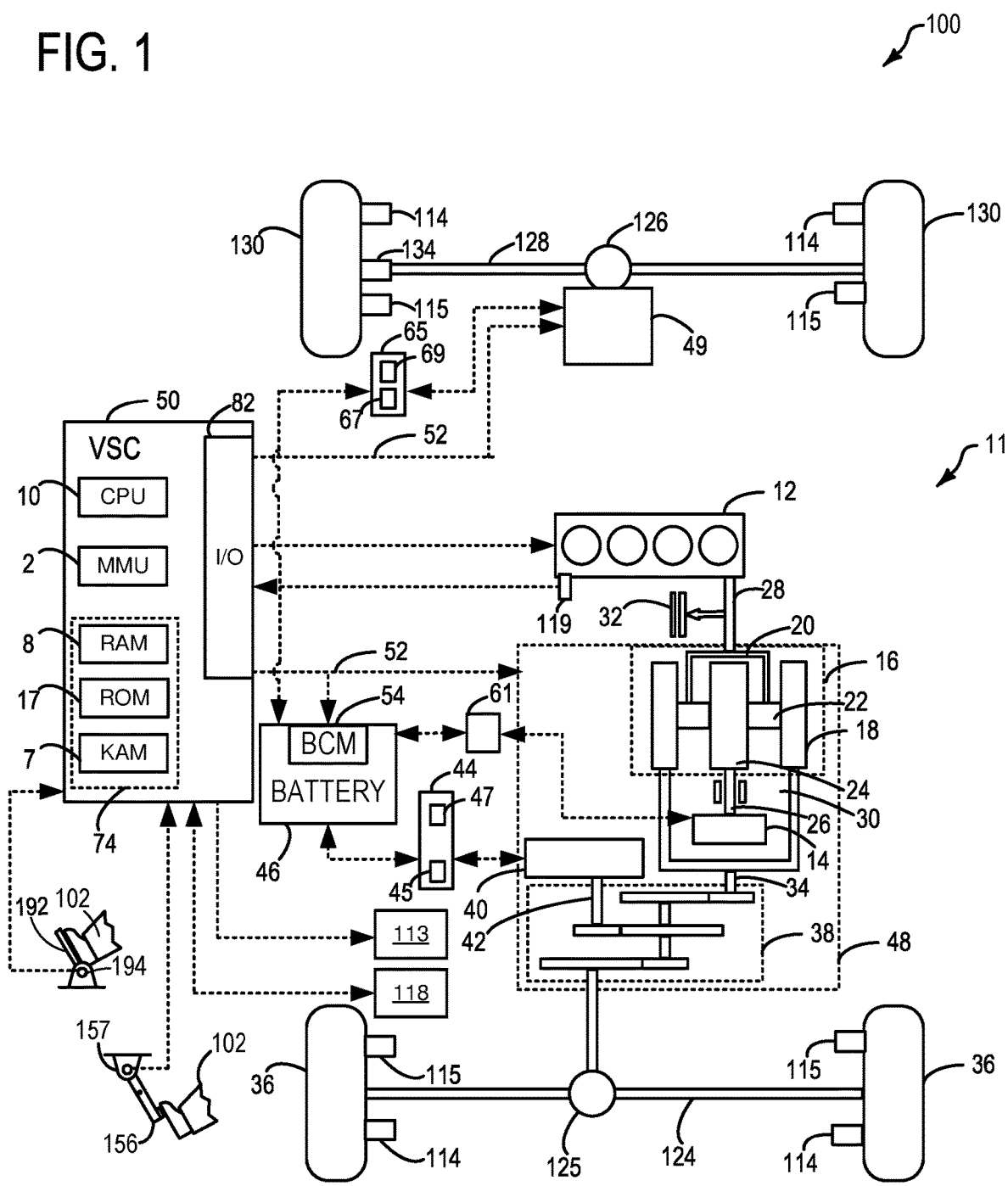
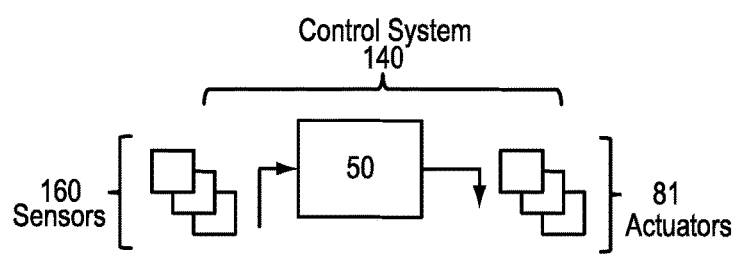

SYSTEMS AND METHODS FOR MANAGING ELECTRIC MOTOR TORQUES IN A HYBRID ELECTRIC VEHICLE

FIELD

The present description relates generally to methods and systems for managing electric motor torque in a vehicle that includes a first electric motor that drives front wheels and a second electric motor that drives rear wheels of a vehicle, responsive to a torque degradation event in one of the motors.

BACKGROUND/SUMMARY

Vehicle powertrain systems may include one or more torque actuators for providing propulsive and/or braking torque to a driveline of the vehicle. Torque actuators can include internal combustion engines and electric motor/generators, for example. Electric motor/generators are used in hybrid electric vehicles (HEVs) and may be used to assist an engine in propelling a vehicle, or may be used to provide propulsive torque in lieu of engine operation. As an example, an electric motor/generator may use a high-voltage battery for supplying high-voltage electrical power through an inverter that converts direct current (DC) to alternating current (AC) for use by the electric motor/generator when the electric motor/generator is operated as a motor. The inverter may additionally convert AC power from the electric motor/generator to DC power for increasing a state of charge of the high-voltage battery when the electric motor/generator is operated as a generator.

Degradation in such systems may include shorts and ground faults in any one of the inverter, electric motor/generator, multi-phase power bus electrically connected between the inverter and the electric motor/generator. Degradation may result in erroneous torque being delivered to driven wheels in some examples. In a case where erroneous torque is determined to be delivered to one of its axles (e.g. front or rear), control strategy may shut down the vehicle as mitigating action, which may prevent the vehicle from being driven. However, the inventors herein have recognized potential issues with such strategy. Specifically, shutting down the vehicle may not account for an origin of the degradation. By not accounting for the origin of the degradation, the vehicle may be shut down when instead mitigating action may be taken to instead enable to vehicle to continue being operated at least for some period of time.

Accordingly, the inventors herein have developed systems and methods to at least partially address the above-mentioned issues. In one example, a method comprises propelling a vehicle at least in part via a first electric machine that provides torque to front wheels and/or via a second electric machine that provides torque to rear wheels of the vehicle, where the front wheels selectively receive torque from an engine, and responsive to an indication of a torque degradation event, adjusting operation of both the first and the second electric machine, and continuing to propel the vehicle. In this way, a vehicle shut down event may be avoided responsive to a torque degradation event being determined.

As an example, the torque degradation event may include an indication that an actual wheel torque differs from an expected wheel torque by more than a threshold torque difference.

As another example, the method may include deactivating the first electric machine under conditions where the torque degradation event is associated with torque provided to the front wheels of the vehicle via the first electric machine. In such an example, the method may further include adjusting output of the second electric machine when the torque degradation event is associated with torque provided to the front wheels of the vehicle, the adjusting including providing a continuously variable rear wheel torque to the rear wheels via the second electric machine as a function of lateral stability of the vehicle. Furthermore, the method may include providing negative torque to the rear wheels via the second electric machine in response to a request to decelerate the vehicle, and maintaining a desired braking distribution between the front wheels and the rear wheels via friction braking of the front wheels.

As yet another example, the method may include deactivating the second electric machine under conditions where the torque degradation event is associated with torque provided to the rear wheels of the vehicle via the second electric machine. In such a method, the method may further include adjusting output of the first electric machine when the torque degradation event is associated with torque provided to the rear wheels of the vehicle, the adjusting including providing a continuously variable front wheel torque to the front wheels via the first electric machine as a function of lateral stability of the vehicle. Furthermore, the method may include providing negative torque to the front wheels via the first electric machine in response to a request to decelerate the vehicle, and maintaining a desired braking distribution between the front wheels and the rear wheels via friction braking of the rear wheels.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 shows an example powertrain in a hybrid electric vehicle (HEV) system;

DETAILED DESCRIPTION

Figure 2:
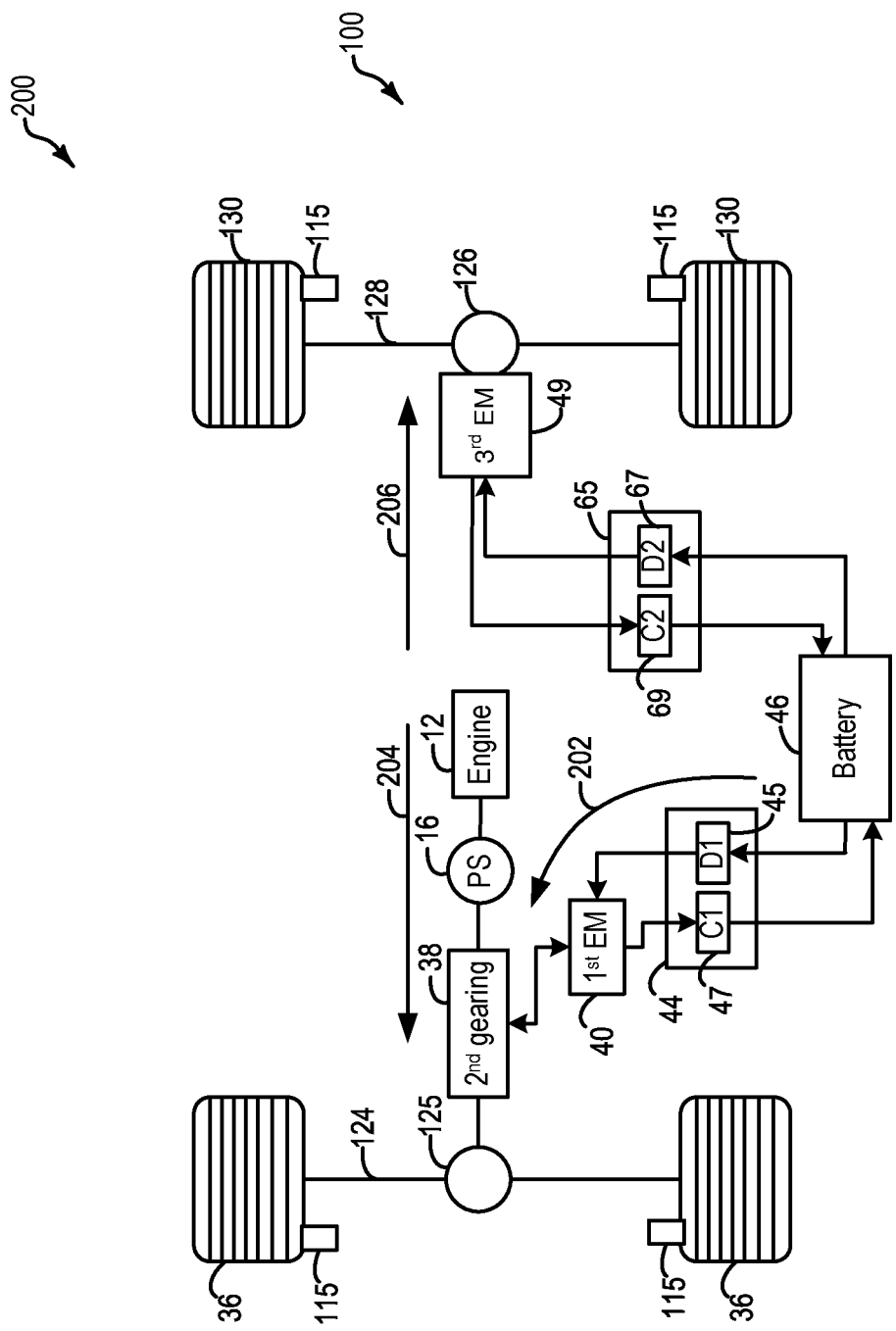
FIG. 2 shows an energy flow diagram for the powertrain of FIG. 1.
Figure 6:
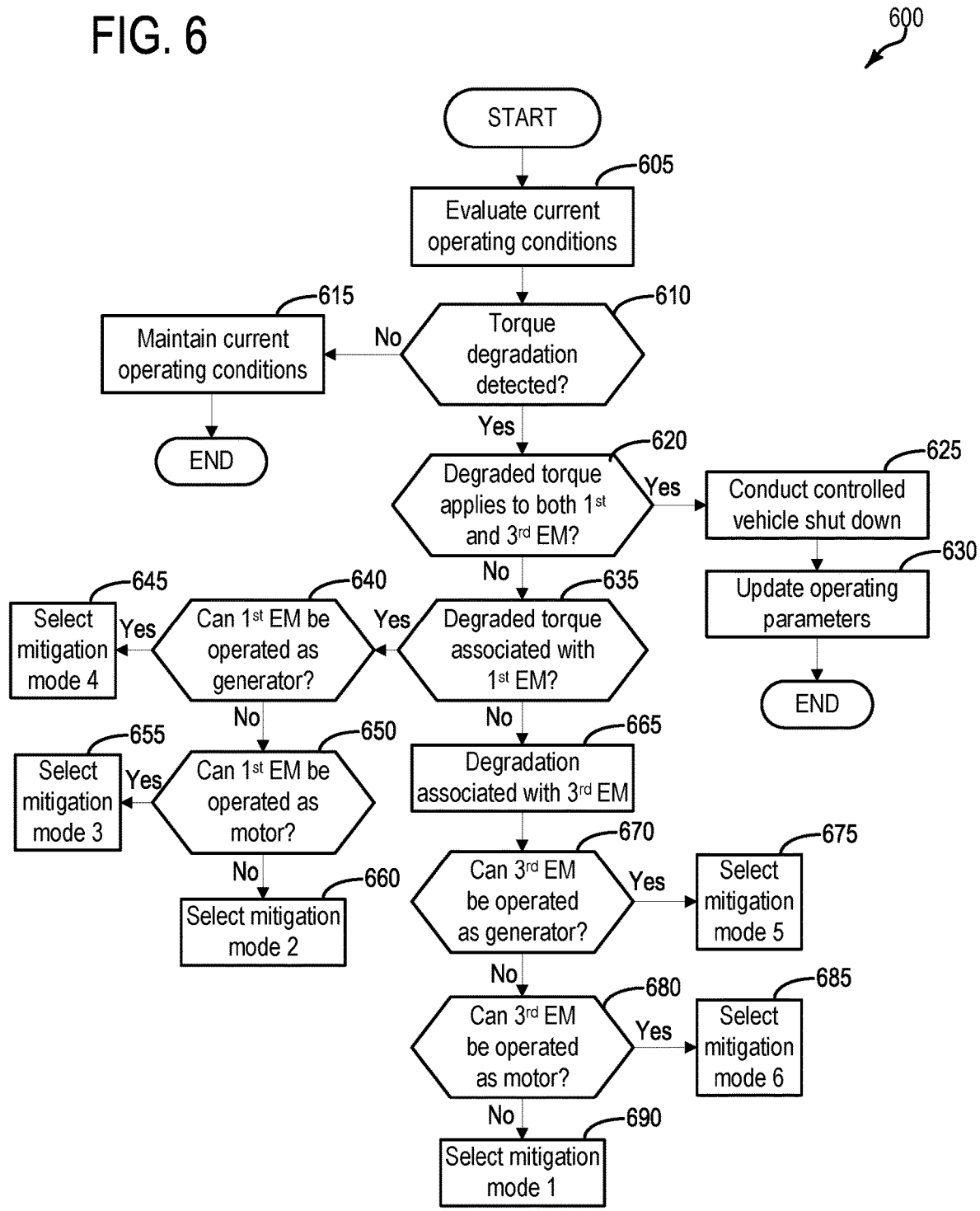
FIG. 6 shows a high-level example method for controlling the vehicle system of FIG. 1 according to one of the mitigation modes of FIGS. 3A-5B in response to an indication of a torque degradation event.
Figure 7:
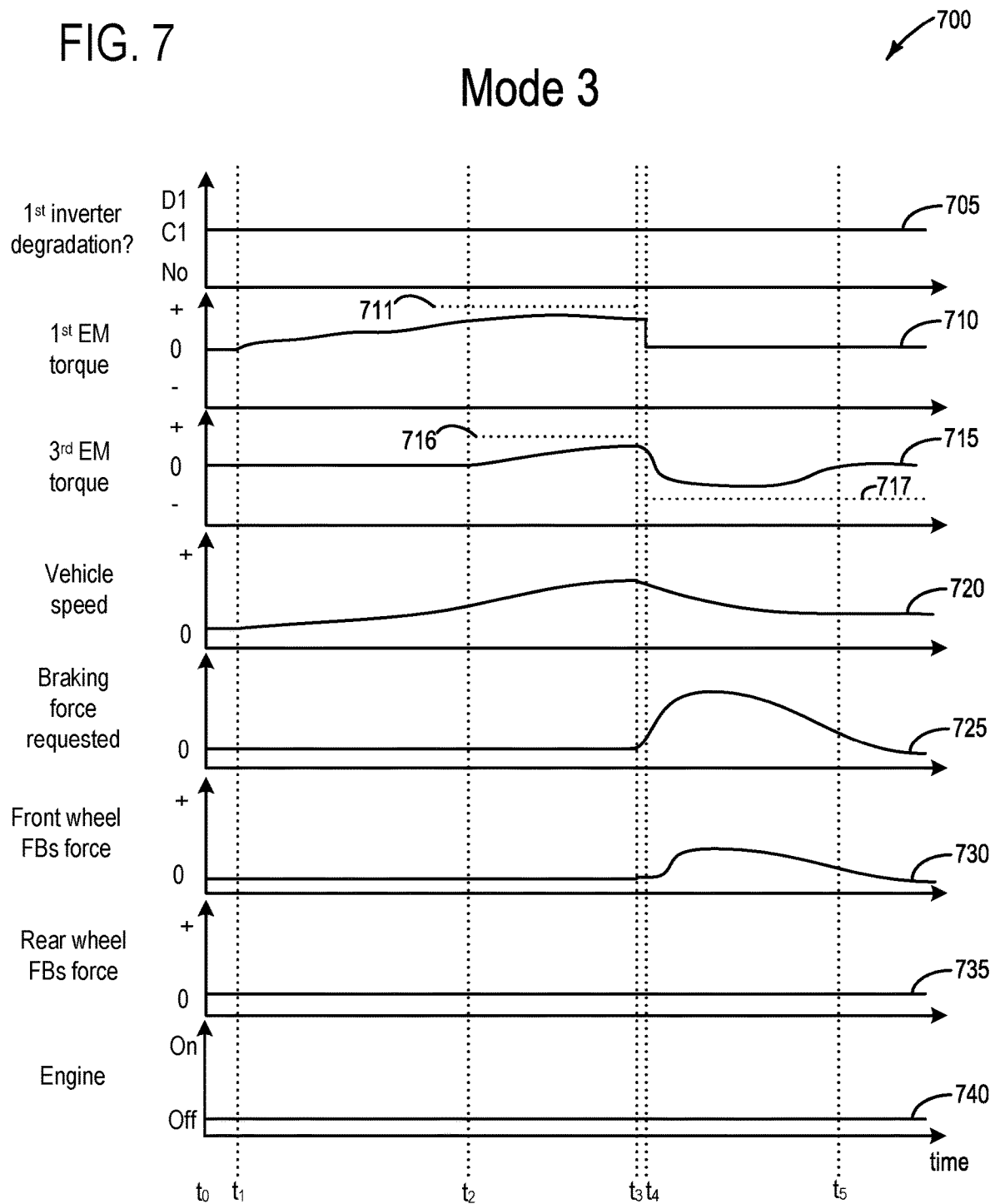
FIG. 7 depicts a prophetic example of how the vehicle system of FIG. 1 is controlled according to the third mitigation mode of operation.
Figure 8:
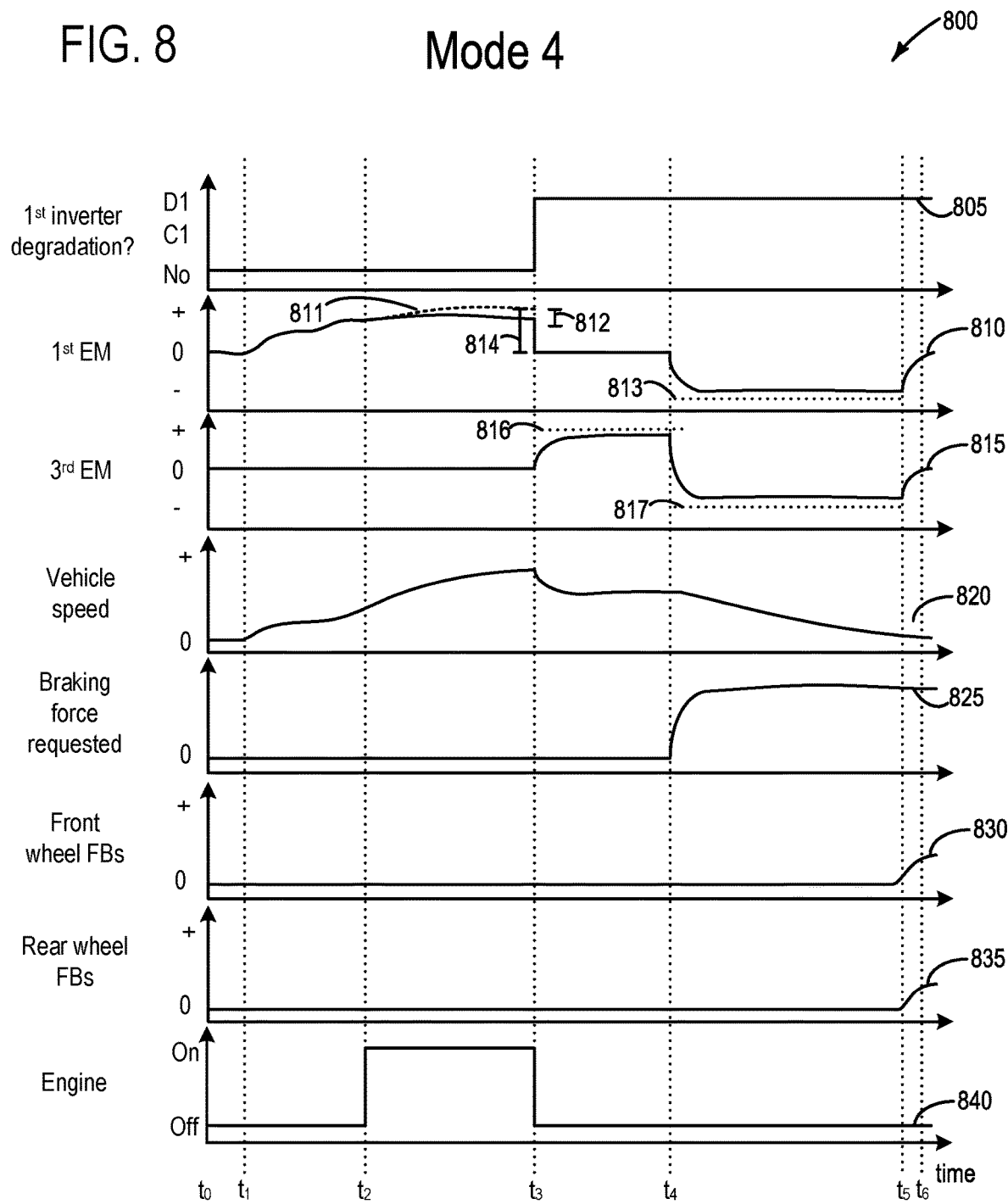
FIG. 8 depicts a prophetic example of how the vehicle system of FIG. 1 is controlled according to the fourth mitigation mode of operation.
Figure 9:
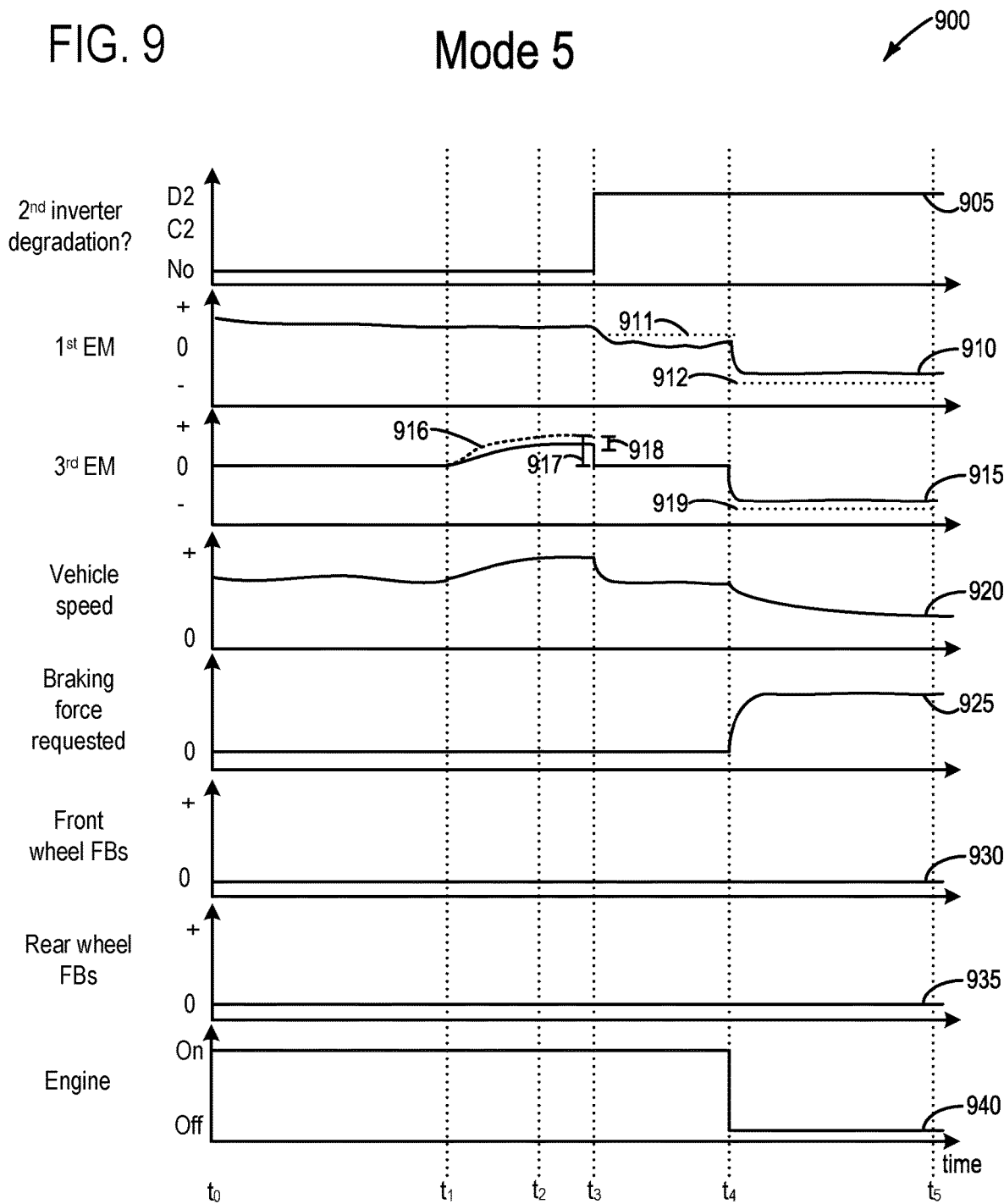
FIG. 9 depicts a prophetic example of how the vehicle system of FIG. 1 is controlled according to the fifth mitigation mode of operation.
Figure 10:
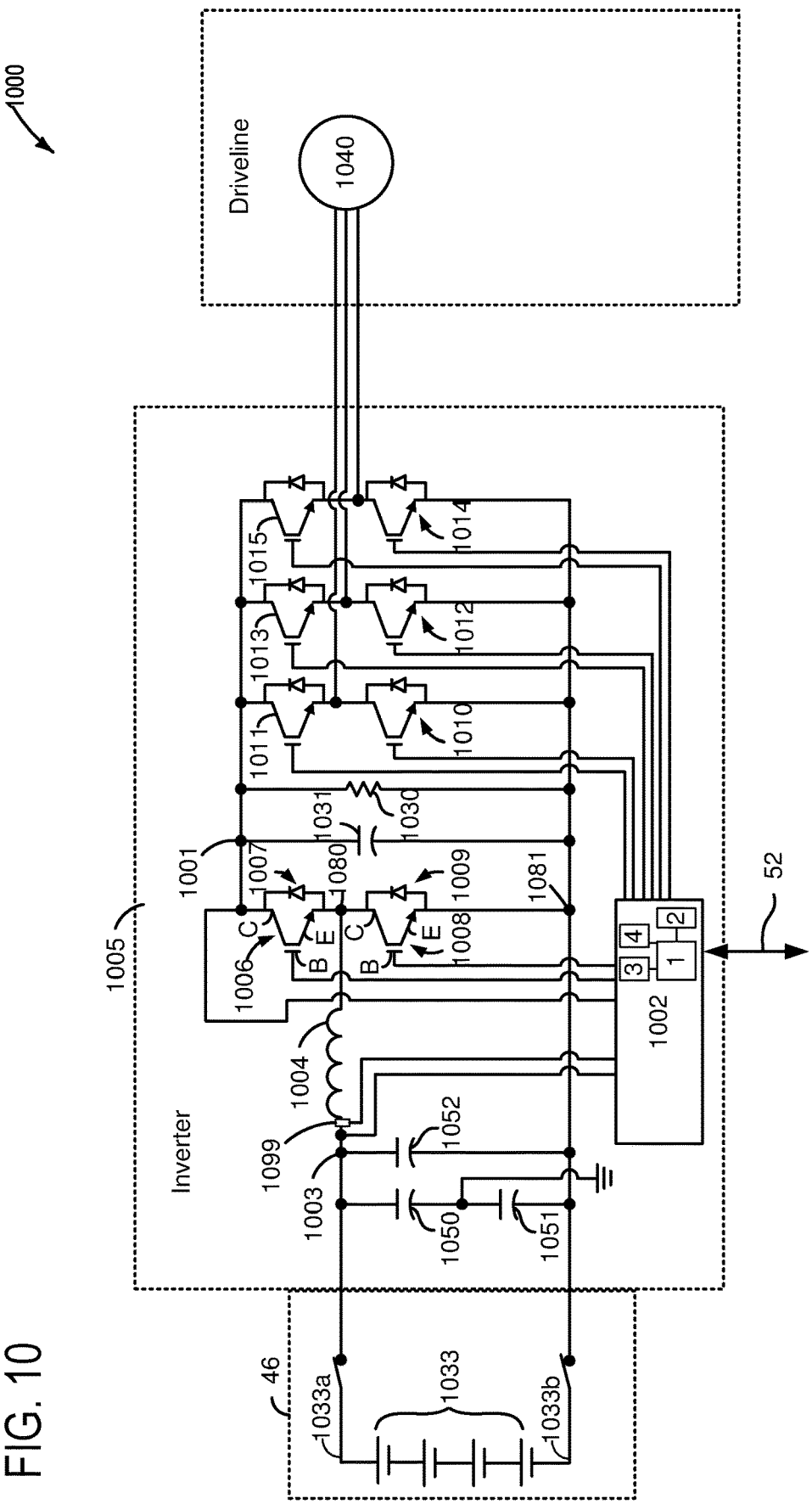
FIG. 10 is a schematic diagram of an inverter.

The following description relates to systems and methods for operating a vehicle system in a mitigating mode of operation in the event that degradation associated with an electric machine that can be used for propelling and decelerating a vehicle, is determined. Such systems and methods may be applicable to hybrid vehicles that include one electric machine that can be used to provide propulsive torque and braking torque to a front axle, and another electric machine that can be used to provide propulsive torque and braking torque to a rear axle. Accordingly, such a hybrid vehicle system is depicted at FIG. 1. FIG. 2 depicts an energy flow diagram illustrating various manners in which energy may flow in the vehicle system of FIG. 1, in an absence of any identified degradation associated with torque sources (e.g. engine, electric machines(s), and inverter(s)). However, it is herein recognized that there may be a number of mitigation modes for operating the vehicle system of FIG. 1, under circumstances where erroneous torque is determined to be delivered to an axle (e.g. front or rear). FIGS. 3A-5B depict various energy flow diagrams showing the various mitigation modes that the vehicle system of FIG. 1 may be operated in, responsive to a torque degradation event (e.g. erroneous torque being provided to driven wheels) being determined. FIG. 6 describes a method for determining a source of the torque degradation event, and controlling the vehicle system by an appropriate mitigation methodology selected from one of the modes of FIGS. 3A-5B. FIGS. 7-9 depict example illustrations of how the vehicle system of FIG. 1 may be controlled, depending on the source of the torque degradation event. FIG. 10 depicts an example inverter circuit that enables the conversion of DC power to AC power and vice versa. In some examples, depending on the source of the torque degradation event described above, the inverter may continue to be used to convert AC power to DC power, but not for converting DC power to AC power. In another example, the inverter may continue to be used to convert DC power to AC power, but not for converting AC power to DC power. In such examples, mitigating action may be taken as mentioned above via one of the mitigation modes of operation described with regard to FIGS. 3A-5B.

Turning now to the figures, FIG. 1 includes a schematic block diagram representation of a vehicle system 100 to illustrate one embodiment of a system or method for controlling a vehicle powertrain according to the present invention. Vehicle system 100 generally represents any vehicle having a conventional or hybrid electric powertrain with an internal combustion engine (ICE) 12. In the depicted embodiment, the vehicle system 100 is a hybrid electric vehicle (HEV) system including an internal combustion engine 12, a battery 46, a first electric machine 40 also referred to herein as first motor/generator 40, a second electric machine 14 also referred to as second motor/generator 14, and a third electric machine 49 also referred to herein as third motor/generator 49. However, it will be appreciated that in alternate embodiments, the torque control methods discussed herein may be applied to other hybrid vehicle configurations without departing from the scope of this disclosure.

The vehicle powertrain 11 includes engine 12 and second electric machine 14 coupled to the engine via a gear set. Engine 12 and second electric machine 14 are connected through a power transfer unit or transmission, which in this embodiment is implemented by a planetary gear set 16. As such, other types of power transfer units, including other gear sets and transmissions, may be used to connect engine 12 to second electric machine 14. Planetary gear set 16 includes a ring gear 18, a carrier 20, planet gears 22, and a sun gear 24.

Second electric machine 14 may be used to provide electric current to charge battery 46 to operate first electric machine 40, or third electric machine 49. Alternatively, second electric machine 14 may be operated as a motor to provide an output torque to shaft 26 connected to sun gear 24. Similarly, operation of engine 12 supplies a torque to shaft 28, which is connected to carrier 20. A brake 30 is provided for selectively stopping rotation of shaft 26, thereby locking sun gear 24 in place. Since this configuration allows torque to be transferred from second electric machine 14 to engine 12, a one-way clutch 32 is provided so that shaft 28 rotates in only one direction. In addition, second electric machine 14 can be used to control the rotational speed of engine 12 via planetary gear set 16 and shaft 28 when and if desired.

Ring gear 18 is connected to a shaft 34, which is connected to vehicle front wheels 36 through a second gear set 38. Front wheels 36 may be coupled to front axle 124. First electric machine 40 may be used to output torque to shaft 42. In some examples, front axle 124 may include front final drive 125. As mentioned, first electric machine 40 may operate as either a motor or a generator. For example, battery 46 may be configured to power first electric machine 40 and operate it as a motor. Other vehicles within the scope of the present invention may have different electric machine arrangements, such as more or less than the first, second, and third electric machines (e.g. 40, 14 and 49 at FIG. 1, respectively) depicted herein. In the embodiment shown in FIG. 1, both first electric machine 40 and second electric machine 14 may be operated as motors using electric current from battery 46 or another source of electric current to provide a desired output torque. Alternatively, both first electric machine 40 and second electric machine 14 may be operated as generators supplying electrical power to an energy storage device, represented by high voltage battery 46. Other types of energy storage devices and/or output devices that can be used include, for example, a capacitor bank, a fuel cell, a flywheel, etc. A first inverter 44 may be used to convert direct current (DC) derived from battery 46 to alternating current (AC). First inverter 44 may additionally be used to convert AC current derived from first electric machine 40 to DC. Thus, it may be understood that when first electric machine 40 is operated as a motor (as opposed to a generator), DC current derived from the battery 46 may be converted via inverter 44 to AC current to power the first electric machine(s). Alternatively, when first electric machine 40 is operated as a generator (as opposed to a motor), AC current derived from the first electric machine may be converted via first inverter 44 to DC current to increase a state of charge (SOC) of battery 46.

Thus, first inverter 44 may include a first inverter element 45 and a first rectifier element 47. First inverter element 45 may also be referred to herein as first discharging element 45 or first discharging circuit 45, and first rectifier element 47 may also be referred to herein as first charging element 47 or first charging circuit 47. Broadly speaking, first discharging element 45 may operate to convert DC current to AC current whereby DC power is fed to a primary winding in a transformer within a housing of first inverter 44, and via an electronic switch (e.g. a set of semiconductor transistors), direction of the flow of current is continuously and regularly flip-flopped (e.g. the electrical charge travels into the primary winding and then abruptly reverses and flows out). This in/outflow of electricity may produce AC current in the transformer's secondary winding circuit, thereby providing power for an AC load (e.g. first or second electric machines). First charging element 47 may be an electronic device similar to the first discharging element 45 with the exception that it does the opposite, converting AC power to DC power. Discussed herein, it may be understood that there may be situations where the first discharging element 45 becomes degraded while first charging element 47 continues to function as desired or expected. In such an example, first inverter 44 may in some examples continue to be used to convert AC power to DC power, but may not be used to convert DC power to AC power. Alternatively, there may be situations where the first charging element 47 becomes degraded while the first discharging element 45 continues to function as desired or expected. In such an example, first inverter 44 may in some examples be used to convert DC power to AC power, but may not be used to convert AC power to DC power, as will be discussed in further detail below. It may be further understood that there may be examples where first inverter 44 continues to function as desired or expected (e.g. both first inverter element 45 and first rectifier element 47 are not degraded to any substantial extent), but where either or both of the first electric machine 40 and second electric machine 14 become degraded (e.g. degraded torque output, also referred to herein as erroneous torque output). In the case of such degradation, whether the degradation be a general degradation associated with first inverter 44 (e.g. degradation not isolated to one of the first charging element 47 or first discharging element 45), degradation confined to one of the first charging element 47 or first discharging element 45, degradation associated with the first electrical machine, or degradation associated with the second electrical machine, mitigating action may be taken as will be elaborated in further detail below.

In similar fashion, third inverter 61 may be used to convert DC current derived from battery 46 to AC current. Third inverter 61 may additionally be used to convert AC current derived from second electric machine 14 to DC current. While not explicitly shown, it may be understood that third inverter 61 may too include an inverter element and a rectifier element.

As shown in FIG. 1, first electric machine 40, second electric machine 14, planetary gear set 16, and a portion of second gear set 38 may generally be referred to as a transaxle 48. One or more controllers 50 implemented in hardware and/or software are provided to control engine 12 and the components of transaxle 48. In the embodiment of FIG. 1, controller 50 is a vehicle system controller (VSC).

Although VSC 50 is shown as a single controller, it may include multiple hardware and/or software controllers. For example, VSC 50 may include a separate powertrain control module (PCM), which could be software embedded within VSC 50, or the PCM could be implemented by a separate hardware device with corresponding software. Those of ordinary skill in the art will recognize that a controller may be implemented by a dedicated hardware device that may include programmed logic and/or an embedded microprocessor executing computer readable instructions to control the vehicle and powertrain. A controller area network (CAN) 52 may be used to communicate control data and/or commands between VSC 50, transaxle 48, and one or more other controllers, such as battery control module (BCM) 54. For example, BCM 54 may communicate data such as battery temperature, state-of-charge (SOC), discharge power limit, and/or other operating conditions or parameters of battery 46. Devices other than battery 46 may also have dedicated controllers or control modules that communicate with VSC 50 to implement control of the vehicle and powertrain. For example, an engine control unit (ECU) may communicate with VSC 50 to control operation of engine 12. In addition, transaxle 48 may include one or more controllers, such as a transaxle control module (TCM), configured to control specific components within 48, such as second electric machine 14 and/or first electric machine 40.

Any or all of the various controllers or control modules, such as VSC 50 and BCM 54 may include a microprocessor based central processing unit (CPU) 10 in communication with a memory management unit (MMU) 2 that manages various computer-readable storage media 74. The computer readable storage media preferably include various types of volatile and non-volatile memory such as a read-only memory (ROM) 17, a random-access memory (RAM) 8, and a keep-alive memory (KAM) 7. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by CPU 10 in controlling the engine, vehicle, or various subsystems. For controller architectures that do not include MMU 2, CPU 10 may communicate directly with one or more storage media 74. CPU 10 communicates with the various sensors and actuators of the engine, vehicle, etc. via an input/output (I/O) interface 82.

VSC 50 may comprise a portion of a control system 140. Control system 140 is shown receiving information from a plurality of sensors 160 (various examples of which are described herein) and sending control signals to a plurality of actuators 81 (various examples of which are described herein). As an example, VSC 50 may receive information from roll stability control sensor 118, which may include a lateral and/or longitudinal and/or yaw rate sensor. As another example, VSC 50 may receive information about how much torque the engine is actually producing via torque sensor 119.

In some examples, vehicle system 100 may include an antilock brake system (ABS) 113. The ABS may include wheel speed sensors 114, for example. The ABS may further include at least two hydraulic valves (not shown) within the brake hydraulics (not shown). Controller 50 may monitor rotational speed of each wheel, and be responsive to detection of a wheel rotating significantly slower than the others, the ABS 113 may be controlled to reduce hydraulic pressure to the brake 115 at the affected wheel, thus reducing the braking force on said wheel. Alternatively, responsive to detection of a wheel rotating significantly faster than the others, the ABS 113 may be controlled to increase hydraulic pressure to the brake at the affected wheel, thus increasing the braking force on said wheel. In still further cases, as will be discussed in further detail below, ABS 113 may command an increased brake pressure at one or more wheels in order to prevent forward motion of the vehicle responsive to a slowing of the engine 12. Herein, increasing brake pressure at one or more wheels via ABS 113 may be referred to as activating, or applying one or more wheel brakes.

VSC 50 may receive an indication of an operator requested output of the vehicle propulsion system from a human operator 102, or an autonomous controller. For example, VSC 50 may receive sensory feedback from pedal position sensor 194 which communicates with pedal 192. Pedal 192 may refer schematically to an accelerator pedal. Similarly, VSC 50 may receive an indication of an operator requested vehicle braking via a human operator 102, or an autonomous controller. For example, VSC 50 may receive sensory feedback from pedal position sensor 157 which communicates with brake pedal 156. Braking of the vehicle may be carried out via friction braking (e.g. via wheel brakes 115) in response to a brake request from the human operator or autonomous controller and/or may be carried out by regenerative braking of the vehicle where the vehicle is slowed by converting its kinetic energy into a form (e.g. electrical energy) which may be used either immediately or stored (e.g. at battery 46) until needed. It may be understood that any one of first electric machine 40, second electric machine 14 and third electric machine 49 may be relied upon for converting vehicle kinetic energy into electrical energy as discussed above by operating the respective electric machine as a generator, as is understood in the art.

Third electric machine 49 may be in communication with rear axle 134 and rear wheels 130 via gear configuration (otherwise referred to as a rear final drive or rear differential) 126. In some embodiments, third electric machine 49 may be configured as what may be referred to as an electric rear axle device (ERAD) system. The ERAD system may include any suitable gearing to enable the third electric machine 49 to provide torque output to rear wheels 130. Thus, third electric machine 49 may selectively supply or absorb torque to rear axle 128 and rear wheels 130. In some embodiments, third electric machine 49 may be coupled directly to final drive 126.

In some examples a second inverter 65 may be used to convert direct current (DC) derived from battery 46 to AC current for use via the third electric machine 49, and to convert AC current derived from third electric machine 49 operating as a generator to DC current for use by one or more of first electric machine 40 and second electric machine 14 and/or for storage at battery 46. Similar to that discussed above, second inverter 65 may include a second inverter element 67 (also referred to as second discharging element 67, or second discharging circuit 67), and a second rectifier element 69 (also referred to herein as second charging element 69, or second charging circuit 69). Second discharging element 67 and second charging element 69 may operate in similar fashion as first discharging element 45 and first charging element 47 discussed above. Similar to that discussed above, there may be situations where the second discharging element 67 becomes degraded while second charging element 69 continues to function as desired or expected. In such an example, second inverter 65 may in some examples continue to be used to convert AC power to DC power, but may not be used to convert DC power to AC power. Alternatively, there may be situations where the second charging element 69 becomes degraded while the second discharging element 67 continues to function as desired or expected. In such an example, second inverter 65 may in some examples continue to be used to convert DC power to AC power, but may not be used to convert AC power to DC power, as will be elaborated in further detail below. It may be further understood that there may be examples where second inverter 65 continues to function as desired or expected (e.g. both second inverter element 67 and second rectifier element 69 are not degraded to any substantial extent), but where the third electric machine 49 becomes degraded (e.g. degradation related to torque output). In the case of such degradation, whether the degradation be a general degradation associated with second inverter 65 (e.g. degradation not isolated to one of second discharging element 65 or second charging element 67), degradation confined to one of the second discharging element 65 or second charging element 67, or degradation associated with the third electric machine, mitigating action may be taken as will be elaborated in further detail below.

Turning now to FIG. 2, depicted is an energy flow diagram 200 corresponding to the hybrid electric vehicle system of FIG. 1. Components of FIG. 2 that are common between FIG. 1 and FIG. 2 share common numerals. Energy flow diagram 200 includes first electrical path 202 and mechanical path 204, along with second electrical path 206. First electrical path 202 may provide torque to front wheels 36 via first electric machine 40 through second gearing 38 and front final drive 125. Mechanical path 204 may provide torque to front wheels 36 via operation of engine 12 operating to transfer torque through planetary gearset 16, second gearing 38 and front final drive 125. Briefly, under light acceleration requests, first electric machine 40 may receive power from battery 46 to drive front wheels 36. More specifically, DC power from battery 46 may be converted via first discharging circuit 45 (D1) of inverter 44 to AC power for use by first electric machine 40 to provide torque to front wheels 36. The engine 12 may remain off. Thus, under light acceleration requests, it may be understood that first electrical path 202 may provide torque to front wheels 36 in absence of torque produced via mechanical path 204.

As torque demand increases, engine 12 may be activated, and torque may be provided to front wheels 36 via both the first electrical path 202 and mechanical path 204. With the engine in operation, second electrical machine (not shown at FIG. 2) may be used to charge battery 46.

Further, during a deceleration condition, engine 12 and/or first electric machine 40 may be operated to generate negative torque transmitted to front wheels 36 to provide engine braking capabilities to decelerate the vehicle. As an example, during a deceleration condition the control system (e.g. control system 140 at FIG. 1) may operate the first electric machine 40 to maximize negative torque output within operating limits of the first electric machine 40 to increase a state of charge (SOC) of battery 46 in what may be referred to herein as regenerative braking. More specifically, AC power generated by the first electric machine 40 operating in a regenerative mode may be converted via first charging circuit 47 (C1) of inverter 44 to DC power for storage at battery 46.

It may be appreciated that, under some conditions, only the first electric machine 40 may be used to decelerate the vehicle, and one or more of fueling, spark and/or valve timing may be adjusted to accelerate braking, for example by increasing engine pumping losses along mechanical path 204. In other examples, braking may additionally or alternatively be accelerated via application of friction brakes (e.g. friction brakes 115) to front wheels 36.

Second electrical path 206 may provide vehicle propulsion by operating third electric machine 49 to provide torque directly to the rear axle 128 via rear final drive 126 to rotate rear wheels 130. More specifically, DC power from battery 46 may be converted via second discharging circuit 67 (D2) of second inverter 65 to AC power for use by third electric machine 49 to provide torque to rear wheels 130. Second electrical path 206 may be relied upon in some examples when engine 12 is not in operation and first electric machine 40 is off. In other words, second electrical path 206 may be used to propel the vehicle in absence of additional torque provided via first electrical path 202 and mechanical path 204. In other examples, second electrical path 206 may be used to supplement torque provided via the first electrical path 202 (and in some examples additionally mechanical path 204).

Further, during a deceleration condition, third electric machine 49 may be operated to generate negative torque transmitted through rear final gearing 126 to rear wheels 130 to provide braking capabilities to decelerate the vehicle. By controlling third electric machine 49 to provide negative brake torque to rear wheels 130, electric energy may be generated that may be stored at battery 46 so that the SOC of battery 46 may be increased. More specifically, AC power generated by the third electric machine 49 operating in a regenerative mode may be converted via second charging circuit (C2) 69 of inverter 65 to DC power for storage at battery 46. In some examples, just the third electric machine 49 may be used to decelerate the vehicle, but it may be understood that in other examples friction braking (e.g. friction brakes 15) may be additionally used to accelerate the braking of rear wheels 130. In still other examples, friction braking of rear wheels 130 may solely be used to decelerate the vehicle.

Under some conditions, first electric machine 40 and third electric machine 49 may be operated cooperatively to propel the vehicle, in absence of operation of engine 12. For example, it may be understood that with the engine off (e.g. engine not combusting), first electric machine 40 may provide torque to front wheels 36 via first electric path 202, and second electric machine 49 may provide torque to rear wheels 130 via second electric path 206. In other examples where the engine 12 is off, one of first electric machine 40 and third electric machine 49 may operate to provide torque to corresponding driven wheels to propel the vehicle. In other words, with the first electric machine 40 off and engine 12 deactivated, third electric machine 49 may be operated to propel the vehicle via second electrical path 206. In another example, with the third electric machine 49 off and with the engine off, first electric machine 40 may be operated to propel the vehicle via first electrical path 202 as discussed above.

Under other conditions where the engine is in operation, the vehicle may be propelled via mechanical path 204, first electrical path 202 and second electrical path 206. In other words, with the engine operating to at least partially propel the vehicle, first electric machine 40 and third electric machine 49 may provide further propulsive torque to front wheels 36 and rear wheels 130, respectively.

Still further, there may be circumstances where both the first electric machine 40 and third electric machine 49 may be operated cooperatively to provide brake torque to front and rear wheels, respectively, to maximize regeneration of battery 46. For example, the first electric machine 40 may provide a particular amount of negative torque to front wheels 36 and third electric machine 49 may provide another particular amount of negative torque to rear wheels 130 for decelerating the vehicle. It may be understood that in some examples where regenerative braking is used to decelerate one axle (e.g. rear axle), friction braking may be used to decelerate the other axle (e.g. front axle).

As discussed, there may be circumstances where degraded torque is determined, where the vehicle system is determined to be delivering undesired torque (e.g. greater torque than desired or a lesser negative torque than desired) to the front wheels or rear wheels via one of the first electric machine (e.g. first electric machine 40 at FIG. 1) or the third electric machine (e.g. third electric machine 49 at FIG. 1). It may be understood that a degraded torque event may be determined responsive to an indication that delivered torque does not match commanded torque within a threshold margin. Strategies to deal with such erroneous torque delivery may include disabling the vehicle as a whole. Such a strategy may not account for whether the degraded torque event is due to an issue stemming from the delivery of torque to front wheels or to rear wheels. However, it is herein recognized that with the arrangement of electric machines as shown at FIG. 1, there may be an option to rely on a different electric machine if there are adverse torque delivery issues associated with a particular electric machine.

Figure 3A:
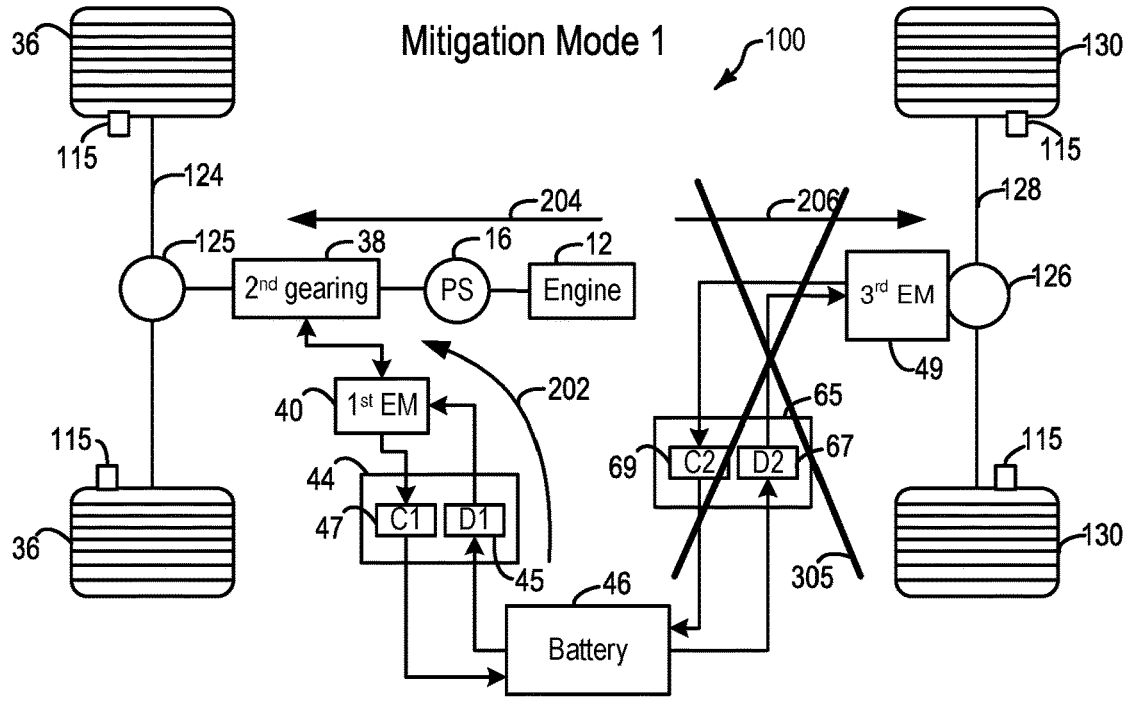
FIG. 3A shows an energy flow diagram for the powertrain of FIG. 1 for operating the vehicle system in a first mitigation mode of operation.

Accordingly, turning now to FIG. 3A, depicted is another example energy flow diagram 300. Energy flow diagram 300 depicts vehicle system 100, and components of vehicle system 100 that are common between FIG. 3A and FIGS. 1-2 are represented as same numerals. It may be understood that energy flow diagram 300 depicts a situation where it has been determined that third electric machine 49 is delivering torque outside of the threshold margin for commanded torque. In other words, actual torque delivered to rear wheels 130 differs from the commanded torque by more than the threshold margin. In such an example, rather than shutting down the vehicle, it may be understood that operation of the third electric machine 49 may be discontinued, and the vehicle may continue to be propelled via the first electric machine 40 and in some examples, engine 12. As will be discussed in further detail below, positive and/or negative torque delivered via the first electric machine 40 may be subject to lateral stability considerations. In the case of negative torque delivery to front wheels 36, it may be understood that a desired braking ratio or distribution may be maintained between the front axle 124 and rear axle 128, even though operation of third electric machine 49 is discontinued, discussed in further detail below.

Thus, energy flow diagram 300 includes an "X" (numbered 305) through the pathway that enables the third electric machine 49 to provide positive or negative torque to rear wheels 130. In such an example, it may be understood that the degradation associated with the torque delivery to rear wheels 130 may be due to degradation of the third electric machine 49 and/or general degradation of second inverter 65. In other words, in a case where there is general degradation of second inverter 65, neither the second charging circuit 69 nor the second discharging circuit 67 may be operating as desired or expected, and thus the third electric machine 49 may not be used for providing positive or negative torque to rear wheels 130. Along similar lines, degradation of the third electric machine 49 itself may result in the third electric machine being unable to accurately provide commanded positive or negative torque to rear wheels 130.

Accordingly, in such an example where the third electric machine cannot be used to provide either positive or negative torque to rear wheels 130, vehicle system 100 may be operated in a first mitigation mode of operation. First mitigation mode may thus include discontinuing any use of third electric machine 49. The vehicle may still be propelled via the first electrical path 202, alone or in combination with the mechanical path 204. To decelerate the vehicle in response to a braking request, first electric machine 40 may be used to provide negative torque to front wheels 36 for regenerative braking, and a braking distribution between front axle 124 and rear axle 128 may be maintained via the use of friction braking (e.g. friction brakes 115) applied to rear wheels 130. The amount of positive torque provided to front wheels 36 may be a continuously variable amount, subject to lateral stability considerations, where lateral stability may be assessed at least in part based on information pertaining to lateral stability via a lateral rate sensor (e.g. roll stability sensor 118 at FIG. 1). Along similar lines, the amount of negative torque provided to front wheels 36 in response to a request for vehicle deceleration may be another continuously variable amount.

Figure 3B:
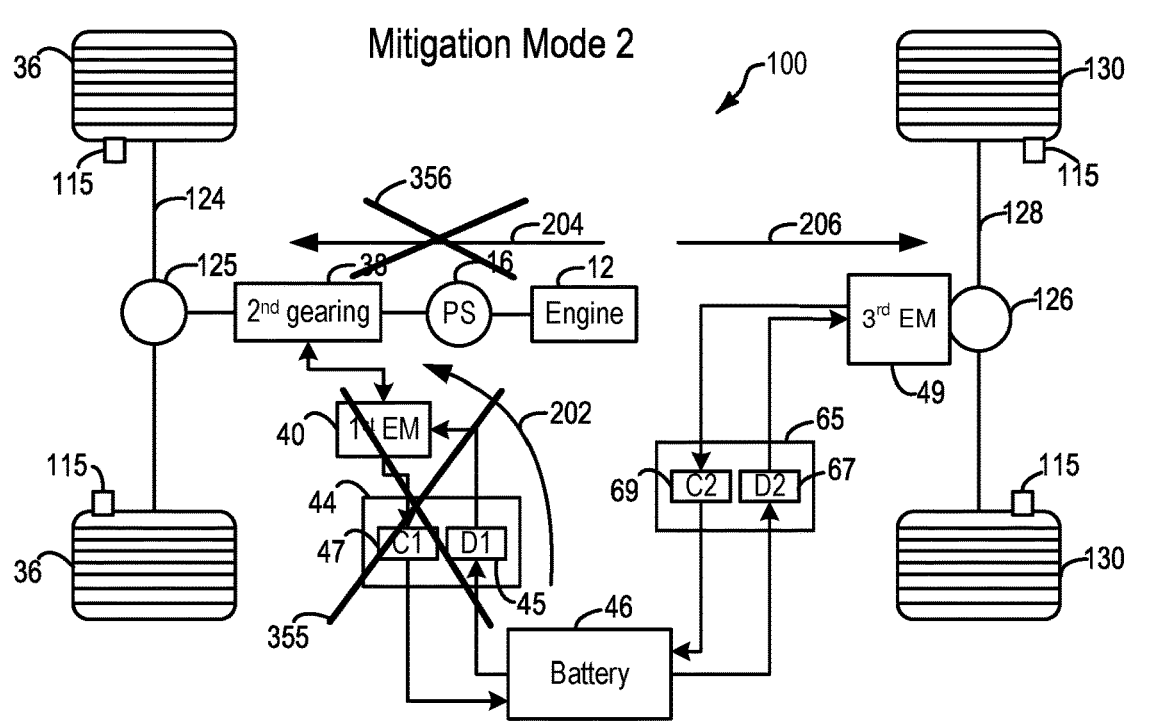
FIG. 3B shows an energy flow diagram for the powertrain of FIG. 1 for operating the vehicle system in a second mitigation mode of operation.

Turning now to FIG. 3B, depicted is another example energy flow diagram 350. Energy flow diagram 350 depicts vehicle system 100, and components of vehicle system 100 that are common between FIG. 3B and FIGS. 1-2 are represented by same numerals. It may be understood that energy flow diagram 350 depicts a situation where it has been determined that first electric machine 40 is delivering torque outside of the threshold margin for commanded torque. In other words, actual torque delivered to front wheels 36 differs from the commanded torque by more than the threshold margin. In such an example, rather than shutting down the vehicle, it may be understood that operation of the first electric machine 40 may be discontinued, and the vehicle may continue to be propelled via the third electric machine 49. As will be discussed in further detail below, positive and/or negative torque delivered to rear wheels 130 may be subject to lateral stability considerations. In the case of negative torque delivery to rear wheels 130, it may be understood that a braking ratio may be maintained between the front axle 124 and rear axle 128, even though operation of first electric machine 40 is discontinued, discussed in further detail below. Furthermore, with the operation of first electric machine 40 discontinued, operation of engine 12 may too be discontinued.

Thus, energy flow diagram 350 includes one "X" (numbered 355) through the pathway that enables the first electric machine 40 to provide positive or negative torque to front wheels 36. In such an example, it may be understood that the degradation associated with the torque delivery to front wheels 36 may be due to degradation of the first electric machine 40 and/or general degradation of first inverter 44. In other words, in a case where there is general degradation of first inverter 44, neither the first charging circuit 47 nor the first discharging circuit 45 may be operating as desired or expected, and thus the first electric machine 40 may not be used for providing positive or negative torque to front wheels 36. Energy flow diagram 350 additionally includes another "X" (numbered 356) through the mechanical pathway 204, to indicate that the mechanical pathway is not operational under circumstances where operation of the first electric machine 40 is discontinued.

Accordingly, in such an example where the first electric machine cannot be used to provide either positive or negative torque to front wheels 36, vehicle system 100 may be operated in a second mitigation mode of operation. Second mitigation mode may thus include discontinuing any use of first electric machine 40. The vehicle may still be propelled via the second electrical path 206. To decelerate the vehicle in response to a braking request, third electric machine 49 may be used to provide negative torque to rear wheels 130 for regenerative braking, and a braking distribution between front axle 124 and rear axle 128 may be maintained via the use of friction braking (e.g. friction brakes 115) applied to front wheels 36. The amount of positive torque provided to rear wheels 130 may be a continuously variable amount, subject to lateral stability considerations, similar to that mentioned above. Along similar lines, the amount of negative torque provided to rear wheels 130 in response to a request for vehicle deceleration may be another continuously variable amount.

Thus, FIGS. 3A-3B depict circumstances where it is determined that there is erroneous torque being delivered via an electrical path to the rear wheels (refer to FIG. 3B), or that there is erroneous torque being delivered via another electrical path to front wheels (refer to FIG. 3A). In such examples, as discussed, torque delivery to the wheels that are receiving the erroneous torque delivery may be discontinued, while torque delivery to the other wheels that are not receiving the erroneous torque delivery may begin or continue.

However, it is herein recognized that there may be other circumstances where it may be possible to more specifically determine a source of issues associated with erroneous torque delivery (positive or negative) to a particular set of wheels. For example, there may be situations where an inverter degradation can be assigned specifically to a problem stemming from one of a charging circuit (e.g. first charging circuit 47, second charging circuit 69) or discharging circuit (e.g. first discharging circuit 45, second discharging circuit 67). In such examples, it may be possible to continue operating the electric machine associated with the inverter degradation, albeit at a potentially reduced capacity, as will be elaborated in further detail below.

Figure 4A:
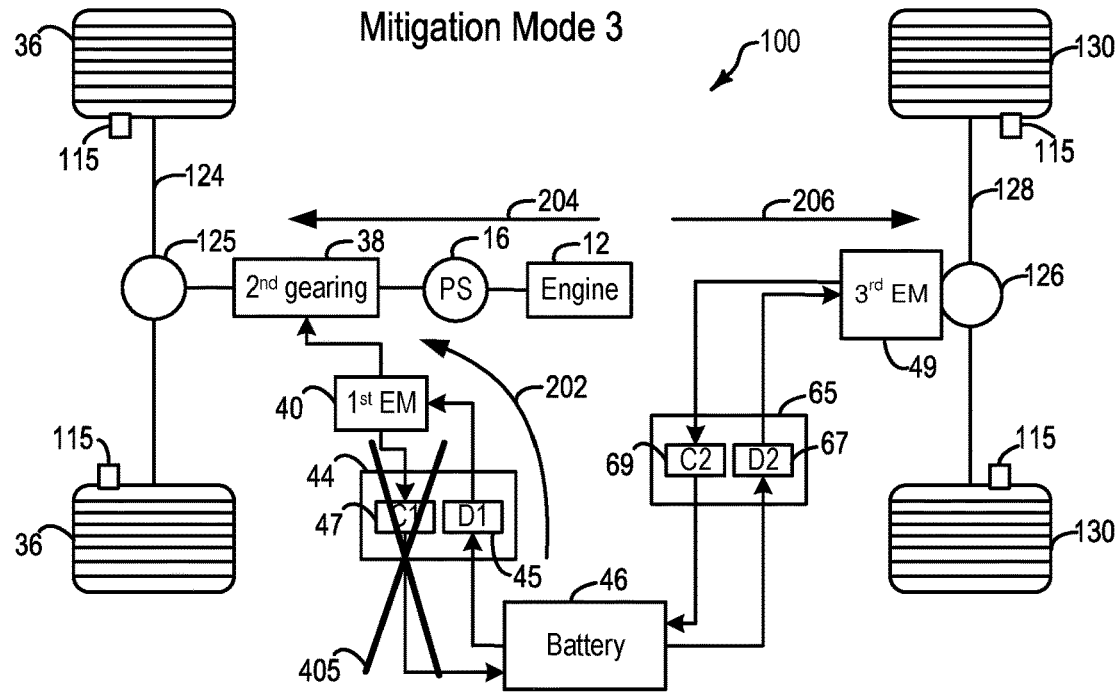
FIG. 4A shows an energy flow diagram for the powertrain of FIG. 1 for operating the vehicle system in a third mitigation mode of operation.

Turning now to FIG. 4A, depicted is another example energy flow diagram 400. Energy flow diagram 400 depicts vehicle system 100, and components of vehicle system 100 that are common between FIG. 4A and FIGS. 1-2 are represented as same numerals. FIG. 4A depicts a situation where there is degradation associated with inverter 44 that is specific to first charging circuit 47. For illustrative purposes, an "X", represented by numeral 405 is used to show that first charging circuit 47 cannot be used to charge battery 46. However, the degradation associated with inverter 44 is such that first discharging circuit 45 of inverter 44 may still be operable to convert DC power from battery 46 to AC power for use by first electric machine 40 to at least partially propel the vehicle.

FIG. 4A thus represents a situation where the first electric machine 40 cannot be used to provide a negative torque to front wheels 36, or in other words cannot be used for regenerative braking. However, due to the first discharging circuit 47 being functional, it may be understood that first electric machine 40 may be used (at least in part) to propel the vehicle. In such an example, third electric machine 49 may be used for propelling the vehicle and for providing an increased charge to battery 46 via regenerative braking. Because the first electric machine 40 cannot be used for regenerative braking operations, friction braking may be used for front wheels 36 during a braking operation. For example, braking of the vehicle may be accomplished via the third electric machine 49 providing a negative torque to rear wheels 130 (e.g. third electric machine operating as a generator), and friction braking may be used (e.g. friction brakes 115) for front wheels 36 to maintain a desired brake force distribution between the front axle 124 and rear axle 128.

Thus, it may be understood that in a situation where first charging circuit 47 cannot be used to charge battery 46, vehicle system 100 may be operated in a third mitigation mode. The third mitigation mode may include propelling the vehicle solely via first electric machine 40 operating as a motor, or via first electric machine 40 operating as a motor to provide positive torque to front wheels 36 while simultaneously third electric machine 49 operates as a motor to provide positive torque to rear wheels 130. When vehicle deceleration is requested, it may be understood that third electric machine 49 may operate as a generator, thereby providing negative torque to rear wheels 130 and charging battery 46 through second charging circuit 69, and a desired brake force distribution between the rear axle and front axle may be provided via friction braking on front wheels 36. The amount of positive torque provided to front wheels 36 via the first electric machine 40 operating as a motor may be a continuously variable amount, and/or the amount of positive torque provided to rear wheels 130 may be another continuously variable amount. Each continuously variable amount may be subject to lateral stability considerations, similar to that mentioned above. Along similar lines, an amount of negative torque provided to rear wheels 130 in response to a request for vehicle deceleration may be yet another continuously variable amount.

Figure 4B:
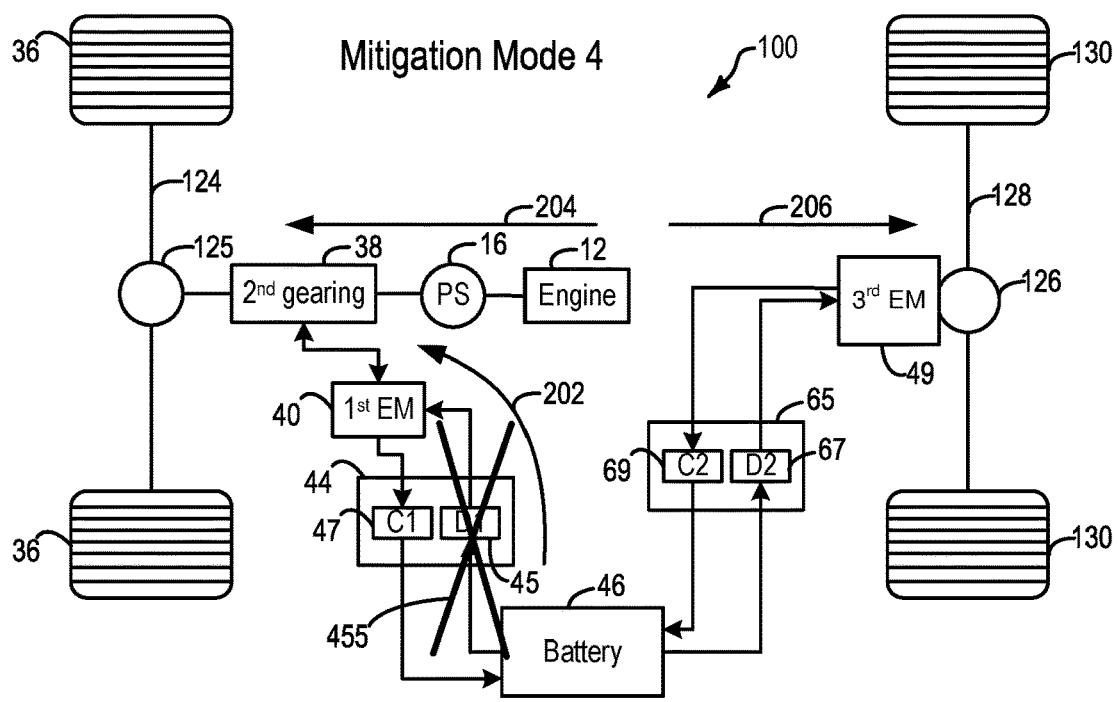
FIG. 4B shows an energy flow diagram for the powertrain of FIG. 1 for operating the vehicle system in a fourth mitigation mode of operation.

Turning now to FIG. 4B, depicted is another example energy flow diagram 450. Energy flow diagram 400 depicts vehicle system 100, and components of vehicle system 100 that are common between FIG. 4B and FIGS. 1-2 are represented as same numerals. FIG. 4B depicts a situation where there is degradation associated with inverter 44 that is specific to first discharging circuit 45. For illustrative purposes, an "X", represented by numeral 455 is used to show that first discharging circuit 45 cannot be used to convert DC power to AC power for use by first electric machine 40 to provide positive torque to front wheels 36. However, the degradation associated with inverter 44 is such that first charging circuit 47 of inverter 44 may still be operable to convert AC power derived from first electric machine 40 operating as a generator to DC power for storage at battery 46.

FIG. 4B thus represents a situation where the first electric machine 40 cannot be used to propel the vehicle, but may still be used for regenerative braking purposes. In such an example, third electric machine 49 may continue to be used for propelling the vehicle and for providing an increased charge to battery 46 via regenerative braking.

Thus, it may be understood that in a situation where first discharging circuit 45 cannot be used to convert DC power from battery 46 to AC power for use by first electric machine 40 for propelling the vehicle, vehicle system 100 may be operated in a fourth mitigation mode. Specifically, in the fourth mitigation mode just the third electric machine 49 may be used to propel the vehicle via the third electric machine 49 providing a positive torque to rear wheels 130. However, both the first electric machine 40 and the third electric machine 49 may be operated as generators to provide negative torque to front wheels 36 and rear wheels 130, respectively, for regenerative braking operations. An amount of negative torque provided to front wheels 36 and rear wheels 130 may be adjusted for achieving a desired brake force distribution between front axle 124 and rear axle 128. In some examples, the regenerative brake force provided to front and/or rear wheels may be supplemented via friction braking (e.g. friction brakes 115), to maintain the desired brake force distribution between front and rear axles. In other words, an amount of positive torque provided to rear wheels 130 via the third electric machine operating as a motor may be a continuously variable amount. Along similar lines, an amount of negative torque that can be provided to front wheels 36 via first electric machine 40 operating as a generator may represent a continuously variable amount of negative torque, and another amount of negative torque that can be provided to rear wheels 130 via the third electric machine operating as a generator may represent another continuously variable amount. Each continuously variable amount may be subject to lateral stability considerations, similar to that mentioned above. In some examples where vehicle deceleration is requested and where the first electric machine 40 and/or the third electric machine 49 are operating as generators, friction braking to either or both of front wheels 36 and/or rear wheels 130 may be used as necessary to maintain a desired brake force distribution between front axle 124 and rear axle 128.

Figure 5A:
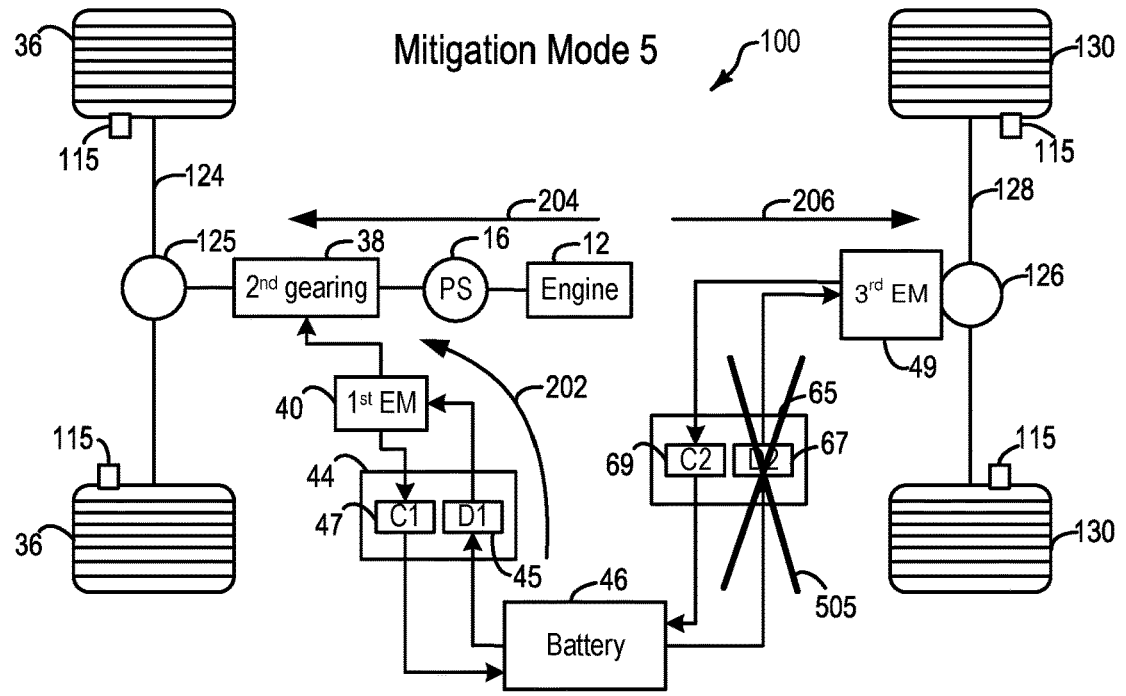
FIG. 5A shows an energy flow diagram for the powertrain of FIG. 1 for operating the vehicle system in a fifth mitigation mode of operation.

Turning now to FIG. 5A, depicted is another example energy flow diagram 500. Energy flow diagram 500 depicts vehicle system 100, and components of vehicle system 100 that are common between FIG. 5A and FIGS. 1-2 are represented as same numerals. FIG. 5A depicts a situation where there is degradation associated with inverter 65 that is specific to second discharging circuit 67. For illustrative purposes, an "X", represented by numeral 505 is used to show that second discharging circuit 67 cannot be used to convert DC power from battery 46 to AC power for use by third electric machine 49 to provide positive torque to rear wheels 130. However, the degradation associated with inverter 65 is such that second charging circuit 69 of inverter 65 may still be operable to convert AC power derived from third electric machine 49 operating as a generator to DC power for storage at battery 46.

FIG. 5A thus represents a situation where third electric machine 49 cannot be used to propel the vehicle, but may still be used for regenerative braking purposes. Thus, it may be understood that in such a situation, vehicle system 100 may be operated in a fifth mitigation mode. In such an example, first electric machine 40 (alone or in combination with operation of engine 12) may be used to provide positive torque to front wheels 36 for propelling the vehicle. The amount of torque provided to front wheels 36 via first electric machine 40 may be a continuously variable amount, subject to lateral stability considerations, similar to that discussed above. As mentioned, third electric machine 49 may not be used to assist in propelling the vehicle due to the second discharging circuit 67 being degraded. However, both the first electric machine 40 and third electric machine 49 may be operated as generators to provide negative torque to front wheels 36 and rear wheels 130, respectively, for regenerative braking operations. An amount of negative torque provided to front wheels 36 and rear wheels 130 may be adjusted for achieving a desired brake force distribution between front axle 124 and rear axle 128. Furthermore, the amount of negative torque provided to front wheels 36 may be a continuously variable amount, and the amount of negative torque provided to rear wheels 130 may be another continuously variable amount. In some examples, the regenerative brake force provided to front and/or rear wheels may be supplemented via friction braking (e.g. friction brakes 115), to maintain the desired brake force distribution between front and rear axles.

Figure 5B:
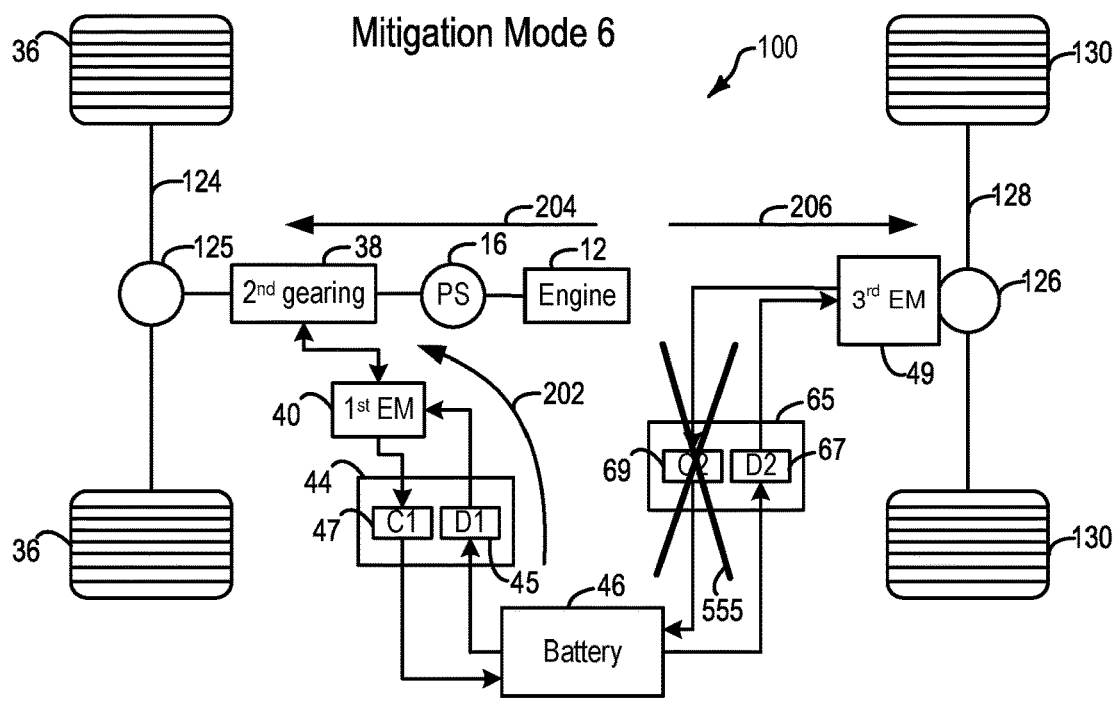
FIG. 5B shows an energy flow diagram for the powertrain of FIG. 1 for operating the vehicle system in a sixth mitigation mode of operation.

Turning now to FIG. 5B, depicted is another example energy flow diagram 550. Energy flow diagram 550 depicts vehicle system 100, and components of vehicle system 100 that are common between FIG. 5B and FIGS. 1-2 are represented as same numerals. FIG. 5B depicts a situation where there is degradation associated with inverter 65 that is specific to second charging circuit 69. For illustrative purposes, an "X", represented by numeral 555 is used to show that second charging circuit 69 cannot be used to charge battery 46. However, the degradation associated with inverter 65 is such that second discharging circuit 67 of inverter 65 may still be operable to convert DC power from battery 46 to AC power for use by third electric machine 49 to at least partially propel the vehicle.

FIG. 5B thus represents a situation where vehicle system 100 may be operated in a sixth mitigation mode. In the sixth mitigation mode of operation, the third electric machine may not be used to provide a negative torque to rear wheels 130, or in other words cannot be used for regenerative braking. However, due to the second discharging circuit 67 being functional, it may be understood that third electric machine 49 may be used (at least in part) for propelling the vehicle. In such an example, it may be understood that the first electrical path 202 and mechanical path 204 remain functional. Thus, first electric machine 40 may additionally or alternatively be used to provide positive torque to front wheels 36 for propelling the vehicle, alone or in combination with torque provided via operation of engine 12. In some examples where first electric machine 40 is providing positive torque to front wheels 36 and where engine 12 is not in operation, third electric machine 49 may be used to provide positive torque to rear wheels 130 for additional wheel torque to propel the vehicle. Similarly, in examples where first electric machine 40 is providing positive torque to front wheels 36 and where engine 12 is operating (e.g. combusting), third electric machine 49 may be used to provide positive torque to rear wheels 130 for additional propulsive energy. An amount of positive torque that may be provided to front wheels 36 via first electric machine 40 may be a continuously variable amount, subject to lateral stability considerations. Similarly, the amount of positive torque that may be provided to rear wheels 130 via third electric machine 49 may be another continuously variable amount, subject to lateral stability considerations. First electric machine 40 may also be operated as a generator, to provide negative torque to front wheels 36 in response to a request for vehicle deceleration. Because third electric machine cannot operate as a generator to charge battery 46, friction braking may be used for rear wheels 130 in order to maintain a desired brake force distribution between front axle 124 and rear axle 128.

Thus, FIGS. 3A-5B depict energy flow diagrams pertaining to how vehicle system 100 may be controlled according to six different mitigation modes, in response to degradation stemming from one or more of first electric machine 40 itself, third electric machine 49 itself, general degradation of first inverter 44 (e.g. neither first charging circuit nor first discharging circuit are operational), general degradation of second inverter 65 (e.g. neither second charging circuit nor second discharging circuit are operational), or selective degradation of first charging circuit 47, first discharging circuit 45, second charging circuit 69, or second discharging circuit 67.

Accordingly, as discussed herein, a system for a hybrid electric vehicle may comprise a first electric machine that provides propulsive effort to a first axle, and a second electric machine that provides propulsive effort to a second axle. The system may further include a controller with computer readable instructions stored on non-transitory memory that when executed, cause the controller to indicate a torque degradation event associated with the first electric machine and/or the second electric machine, and in response to the torque degradation event being indicated, adjust operation of both the first electric machine and the second electric machine in order to continue propelling the hybrid electric vehicle.

In one example of the system, adjusting operating of both the first electric machine and the second electric machine may include deactivating one of the first electric machine or the second electric machine, and limiting torque output of the other of the first electric machine or the second electric machine according to the deactivation of the one of the first electric machine or the second electric machine. Such a system may further comprise a first inverter electrically coupled to the first electric machine. The controller may store further instructions to, in response to the torque degradation event being due to the first inverter being degraded in its ability to convert direct current to alternating current but not in its ability to convert alternating current to direct current, rely on the first electric machine for regenerative braking but not propulsive effort, and limit both propulsive torque output and regenerative torque of the second electric machine. For such a system, the controller may store further instructions to, in response to the torque degradation event being due to the first inverter being degraded in its ability to convert alternating current to direct current but not in its ability to convert direct current to alternating current, rely on the first electric machine for propulsive effort but not regenerative braking, and limit both propulsive torque output and regenerative torque of the second electric machine. In another example of such a system, the system may further comprise a second inverter electrically coupled to the second electric machine. The controller may store further instructions to, in response to the torque degradation event being due to the second inverter being degraded in its ability to convert direct current to alternating current but not in its ability to convert alternating current to direct current, rely on the second electric machine for regenerative braking but not propulsive effort, and limit both propulsive torque output and regenerative torque of the first electric machine. Furthermore, the controller may store further instructions to, in response to the torque degradation event being due to the second inverter being degraded in its ability to convert alternating current to direct current but not in its ability to convert direct current to alternating current, rely on the second electric machine for propulsive effort but not regenerative braking, and limit both propulsive torque output and regenerative torque of the first electric machine.

Turning now to FIG. 6, an example method 600 is shown for determining a presence of degradation that may affect how electric machines deliver positive and/or negative torque to front wheels and rear wheels of a vehicle, and for controlling the vehicle system appropriately according to one of six mitigation modes of operation. Method 600 will be described with reference to the systems and components described herein and shown in FIGS. 1-5B, though it will be appreciated that similar methods may be applied to other systems and components without departing from the scope of this disclosure. Instructions for carrying out method 600 and the rest of the methods included herein may be executed by a controller, such as vehicle system controller 50 at FIG. 1, based on instructions stored in non-transitory memory, and in conjunction with signals received from sensors of the engine system and vehicle powertrain as discussed with regard to FIG. 1. The controller may employ actuators such as first electric machine, third electric machine, friction brakes, etc., to alter state of devices in the physical world according to the methods depicted below.

Method 600 begins at 605 and includes estimating and/or measuring vehicle operating conditions. Operating conditions may be estimated, measured, and/or inferred, and may include one or more vehicle conditions, such as vehicle speed, vehicle location, etc., various engine conditions, such as engine status, engine temperature, engine oil temperature, coolant temperature, engine load, engine speed, A/F ratio, manifold air pressure, etc., various fuel system conditions, such as fuel level, fuel type, fuel temperature, etc., various operating conditions related to electric machine operation such as battery SOC, battery temperature, temperature of relevant electric components, motor torque capability, etc., as well as various ambient conditions, such as ambient temperature, humidity, barometric pressure, etc.

Proceeding to 610, method 600 includes indicating whether a torque degradation event is detected. It may be understood that the torque degradation event may be degradation specific to the ability of the vehicle system to provide positive or negative torque to the front wheels and/or degradation specific to the ability of the vehicle system to provide positive or negative torque to the rear wheels. As one example, the torque degradation may be identified under conditions where an actual torque (positive or negative) being provided via the first electric machine (e.g. first electric machine 40 at FIG. 1) and/or the third electric machine (e.g. third electric machine 49 at FIG. 1) is different than an expected amount of torque (positive or negative) by a threshold amount. It may be understood that such torque degradation may be due to any number of system faults. Additionally or alternatively, the torque degradation may be identified under conditions where it is determined via the controller that the first inverter (e.g. first inverter 44 at FIG. 1) is capable of converting DC power to AC power, but cannot convert AC power to DC power. Additionally or alternatively, the torque degradation may be identified under conditions where it is determined via the controller that the first inverter is capable of converting AC power to DC power, but is not capable of converting DC power to AC power. Additionally or alternatively, the torque degradation may be identified under conditions where it is determined via the controller that the third inverter is capable of converting DC power to AC power, but cannot convert AC power to DC power. Additionally or alternatively, the torque degradation may be identified under conditions where it is determined via the controller that the third inverter is capable of converting AC power to DC power, but cannot convert DC power to AC power.

As one example, it may be determined that the first inverter is not capable of converting AC power to DC power when the first electric machine is commanded to provide a negative torque and operate as a generator, but where battery SOC does not increase (or the rate of increase differs by more than a threshold difference from an expected SOC rate increase). In such an example, if the first electric machine can be used to provide positive torque that is not degraded as compared to an expected positive torque, then it may be determined that the first charging circuit of the first inverter is degraded but that the first discharging circuit is not degraded. In such an example, the first inverter may be used to convert DC power to AC power, but may not be used for converting AC power to DC power. Similar reasoning may apply to a similar torque degradation event associated with the third electric machine.

As another example, it may be determined that the first inverter is not capable of converting DC power to AC power when the first electric machine is commanded to provide a positive torque and operate as a motor, but where an actual torque provided differs from an expected torque by more than a threshold. In such an example, if the first electric machine can be used to provide a negative torque and where the negative torque provided increases battery SOC at an expected rate (e.g. within a threshold range of the expected rate), then it may be determined that the first discharging circuit of the first inverter is degraded but that the first charging circuit is not degraded. In such an example, the first inverter may be used to convert AC power to DC power, but may not be used to convert DC power to AC power. Similar reasoning may apply to a similar torque degradation event associated with the third electric machine.

If, at 610 torque degradation is not indicated, then method 600 may proceed to 615. At 615, method 600 includes maintaining current operating conditions. For example, due to the absence of torque degradation being indicated the vehicle system need not be operated in any one of the mitigation modes discussed above with regard to FIGS. 3A-5B. Method 600 may then end.

Returning to 610, responsive to torque degradation being detected, method 600 proceeds to 620. At 620, method 600 includes indicating if the torque degradation applies to both the first electric machine and the third electric machine. In other words, at 620 method 600 judges whether the torque degradation is such that neither the first electric machine nor the third electric machine can be used for providing positive or negative torque to respective driven wheels. The degradation may be specific to the first electric machine and the second electric machine themselves, or may be related to general degradation of the first inverter and second inverter. If the torque degradation applies to both the first electric machine and the third electric machine, then method 600 proceeds to 625. At 625, method 600 includes conducting a controlled vehicle shutdown. Conducting the controlled vehicle shutdown may include notifying the vehicle operator of the impending shutdown, and then proceeding with the controlled shutdown. The notification may be in the form of one or more of an audible message generated by the controller (e.g. an audible alert sent through speakers of the vehicle audio system), a visual message displayed, for example, at the vehicle dash, etc. The controlled shutdown may include discontinuing operation of both the first electric machine and the third electric machine, and discontinuing engine operation. Vehicle speed at the time of the controlled shutdown may be used by the vehicle operator to navigate to a desired location where mitigating action may be taken to have the vehicle serviced.

Accordingly, responsive to conducting the controlled shutdown, method 600 proceeds to 630. At 630, method 600 includes updating vehicle operating parameters. Specifically, due to the torque degradation applying to both the first electric machine and the second electric machine, appropriate diagnostic trouble codes (DTCs) may be set, and a malfunction indicator light (MIL) may be illuminated at the vehicle dash to alert the vehicle operator of the request to service the vehicle. Method 600 may then end.

Returning to 620, if the torque degradation does not apply to both the first electric machine and the third electric machine, then method 600 proceeds to 635. At 635, method 600 includes indicating whether the torque degradation is associated with the first electric machine. If so, then method 600 proceeds to 640. At 640, method 600 includes indicating whether the first electric machine can continue to be used as a generator. If so, then method 600 proceeds to 645, where the vehicle system is operated according to the fourth mitigation mode (refer to FIG. 4B and description thereof).

Returning to 640, if it has been determined that the torque degradation is associated with the electric machine and that the first electric machine cannot be operated as a generator, then method 600 proceeds to 650. At 650, method 600 includes judging whether the first electric machine can be operated as a motor. If so, then method 600 proceeds to 655, where the vehicle system is operated according to the third mitigation mode (refer to FIG. 4A and description thereof).

Returning to 650, if the degradation is associated with the first electric machine and it is determined that the first electric machine cannot be operated as a motor or a generator, then method 600 proceeds to 660, where the vehicle system is operated according to the second mitigation mode of operation (refer to FIG. 3B and description thereof).

Returning to 635, in response to torque degradation being determined, but where the torque degradation is not associated with the first electric machine, method 600 proceeds to 665, where it is determined that the torque degradation is associated with the third electric machine. Responsive to the determination, method 600 proceeds to 670. At 670, method 600 includes indicating whether the third electric machine can continue to operate as a generator. If so, then method 600 may proceed to 675 where the vehicle system is operated according to the fifth mitigation mode of operation (refer to FIG. 5A and description thereof).

Returning to 670, responsive to the indication that the third electric machine cannot continue to operate as a generator, method 600 proceeds to 680. At 680, method 600 judges whether the third electric machine can continue to operate as a motor. If so, then method 600 proceeds to 685 where the vehicle system is operated according to the sixth mitigation mode of operation (refer to FIG. 5B and description thereof).

Returning to 680, if it is determined that the third electric machine cannot continue to be operated as a motor or a generator, then method 600 proceeds to 690. At 690, method 600 includes operating the vehicle system according to the first mitigation mode of operation (refer to FIG. 3A and description thereof).

Thus, discussed herein, a method may comprise propelling a vehicle at least in part via a first electric machine that provides torque to front wheels and/or via a second electric machine that provides torque to rear wheels of the vehicle, where the front wheels selectively receive torque from an engine, and responsive to an indication of a torque degradation event, adjusting operation of both the first and the second electric machine, and continuing to propel the vehicle.

For such a method, the torque degradation event may include an indication that an actual wheel torque differs from an expected wheel torque by more than a threshold torque difference for a period of time.

For such a method, the method may further comprise deactivating the first electric machine under conditions where the torque degradation event is associated with torque provided to the front wheels of the vehicle via the first electric machine. The method may further comprise adjusting output of the second electric machine when the torque degradation event is associated with torque provided to the front wheels of the vehicle, the adjusting including providing a continuously variable rear wheel torque to the rear wheels via the second electric machine as a function of lateral stability of the vehicle. In some examples, the method may further comprise providing negative torque to the rear wheels via the second electric machine in response to a request to decelerate the vehicle, and maintaining a desired braking distribution between the front wheels and the rear wheels via friction braking of the front wheels.

In some examples, the method may further comprise discontinuing or maintaining discontinued operation of the engine responsive to the torque degradation event being associated with torque provided to the front wheels of the vehicle.

For such a method, the method may further comprise deactivating the second electric machine under conditions where the torque degradation event is associated with torque provided to the rear wheels of the vehicle via the second electric machine. In some examples, the method may further comprise adjusting output of the first electric machine when the torque degradation event is associated with torque provided to the rear wheels of the vehicle, the adjusting including providing a continuously variable front wheel torque to the front wheels via the first electric machine as a function of lateral stability of the vehicle. In some examples, the method may further comprise providing negative torque to the front wheels via the first electric machine in response to a request to decelerate the vehicle, and maintaining a desired braking distribution between the front wheels and the rear wheels via friction braking of the rear wheels. In some examples, the method may further comprise providing torque to the front wheels via the engine responsive to deactivating the second electric machine under conditions where the first electric motor cannot meet a driver demanded wheel torque.

As another example, a powertrain method may comprise evaluating a first electric machine that provides propulsive effort to a first axle and a second electric machine that provides propulsive effort to a second axle for torque output degradation, deactivating one of the first electric machine or the second electric machine in response to an indication of torque output degradation, and limiting torque output of the other of the first electric machine or the second electric machine according to the deactivation of the one of the first electric machine or the second electric machine.

For such a method, the method may further comprise monitoring a lateral stability of the vehicle in response to deactivating one of the first electric machine or the second electric machine, and wherein limiting torque output of the other of the first electric machine or the second electric machine is based on the lateral stability of the vehicle.

For such a method, the method may further comprise limiting regenerative braking of the other of the first electric machine or the second electric machine in response to the deactivation of the one of the first electric machine or the second electric machine. Limiting regenerative braking torque may be based on a desired braking distribution between the first axle and the second axle, and wherein the desired braking distribution is maintained via the use of friction braking on wheels coupled to whichever axle is associated with a deactivated electric machine.

Turning now to FIG. 7, it depicts a prophetic example timeline 700 for controlling the vehicle system in the third mitigation mode of operation (refer to FIG. 4A and discussion thereof). Timeline 700 includes plot 705, indicating whether there is first inverter degradation (e.g. first inverter 44 at FIG. 1), over time. There may not be first inverter degradation (no), or the degradation may be specific to the first charging element (C1) (e.g. first charging element 47 at FIG. 1) or first discharging element (D1) (e.g. first discharging element 45 at FIG. 1). While not specifically illustrated at FIG. 7, it may be understood that there is no degradation associated with the third electric machine (e.g. third electric machine 49 at FIG. 1). Timeline 700 further includes plot 710, indicating torque provided by the first electric machine, which may be either positive (e.g. propulsive) torque (+), or negative (e.g. braking) torque (−) with respect to no torque (0) over time. Timeline 700 further includes plot 715, indicating torque provided by the third electric machine, which may be either positive (e.g. propulsive) torque (+), or negative (e.g. braking) torque (−) with respect to no torque (0) over time. Timeline 700 further includes plot 720, indicating vehicle speed, over time. The vehicle may be stationary (0), or its speed may be greater than (+) stopped. It may be understood that for this example timeline 700, vehicle speed pertains to the vehicle traveling in a forward, as opposed to a reverse, direction. Timeline 700 further includes plot 725, indicating a braking force requested, over time. There may be an absence of braking torque requested (0), or the braking force may be greater than (+) the absence of braking torque, over time. Timeline 700 further includes plot 730, indicating a level of force applied to front wheels via friction brakes, over time. There may be no friction brakes applied (0), or the force applied to the front wheels may be greater than (+) the absence of force applied. Similarly, timeline 700 includes plot 735, indicating a level of force applied to rear wheels via friction brakes, over time. Timeline 700 further includes plot 740, indicating whether the engine is operating (e.g. combusting air and fuel) (on), or is off, over time.

At time t0, the engine is off (plot 740), and the vehicle is stationary (plot 720). With the vehicle stationary, the first electric machine is not providing any torque (plot 710), and the third electric machine is not providing any torque either (plot 715). The vehicle is stationary, but braking is not currently being requested as the engine is off and torque is not being provided via the first or third electric machine. Accordingly, there is an absence of friction braking applied to both the front and rear wheels (plots 730 and 735, respectively). Furthermore, it has been previously determined that there is degradation associated with the first inverter, specific to the first charging circuit (C1) (plot 705).

At time t1, propulsive torque is requested via the vehicle operator (e.g. via depression of the accelerator pedal), and because the degradation associated with the first inverter is specific to the first charging circuit such that the first discharging circuit remains non-degraded, the propulsive torque is provided to the front wheels via the first electric machine. Thus, between time t1 and t2, positive torque provided by the first electric machine increases as a function of driver demand, and vehicle speed correspondingly increases. At time t2, torque produced via the first electric machine nears its upper limit, represented by line 711. The upper limit 711 may be a calibrated limit that is a function of battery SOC, lateral stability considerations, battery temperature, first electric machine speed, etc. However, at time t2 the vehicle operator continues to request propulsive torque, and thus the request is met via the third electric machine providing propulsive torque to the rear wheels. Thus, between time t2 and t3, vehicle speed continues to increase as both the first electric machine and the third electric machine provide propulsive torque to the front and rear wheels, respectively. It may be understood that the first electric machine can provide propulsive torque because the first discharging circuit (D1) remains functional, even though the first charging circuit (C1) cannot be used for converting AC power to DC power for storage at battery 46. Line 716 represents another upper limit corresponding to the third electric machine torque output, which may be a calibrated limit that is a function of battery SOC, lateral stability considerations, battery temperature, third electric machine speed, etc.

At time t3, the vehicle operator requests vehicle deceleration (plot 725) by beginning to depress the brake pedal. Because the first electric machine cannot be used to provide negative torque to the front wheels due to the first charging circuit of the first inverter being degraded, the first electric machine is commanded off at time t4. However, beginning at time t4 the third electric machine begins to operate as a generator, providing negative torque to the rear wheels in order to decelerate the vehicle via regenerative braking. A desired braking distribution is maintained between the front axle and the rear axle by supplementing the regenerative braking torque at the rear wheels with friction braking at the front wheels. Furthermore, the negative torque applied to the rear wheels does not exceed negative torque limit 717, which represents a calibrated limit that may be a function of one or more of battery SOC, lateral stability considerations, battery temperature, desired braking distribution between front and rear axles, third electric machine speed, etc.

The braking request between time t4 and t5 is transient. In other words, the vehicle operator requests vehicle deceleration by pressing down on the brake pedal, but then proceeds to release the brake pedal. The negative torque provided to the rear wheels and the friction braking torque applied to the front wheels is controlled accordingly, as a function of at least desired braking distribution between front and rear axles and driver demand. At time t5, regenerative braking torque is no longer requested, and after time t5 friction braking torque to the front wheels is phased out as a function of braking torque requested. It may be understood that after time t5 the vehicle coasts for a period of time before either vehicle acceleration or deceleration is further requested.

Thus, based on the prophetic example depicted at FIG. 7, it may be understood that under conditions where the first inverter has degradation specific to the first charging circuit, the vehicle system may be controlled according to the third mitigation mode of operation, where the first electric machine can be used for providing propulsive torque to the front wheels (alone or in conjunction with propulsive torque provided via the third electric machine to the rear wheels). In such an example, vehicle deceleration responsive to a braking request may be accomplished via the use of a combination of regenerative braking at the rear axle and friction braking at the front axle to maintain desired braking distribution between front and rear axles.

Turning now to FIG. 8, depicted is a prophetic example timeline 800 for controlling the vehicle system in the fourth mitigation mode of operation (refer to FIG. 4B and discussion thereof). Timeline 800 includes plot 805, indicating whether there is first inverter degradation (e.g. first inverter 44 at FIG. 1), over time. There may not be first inverter degradation (no), or the degradation may be specific to the first charging element (C1) (e.g. first charging element 47 at FIG. 1) or first discharging element (D1) (e.g. first discharging element 45 at FIG. 1). While not specifically illustrated at FIG. 8, it may be understood that there is no degradation associated with the third electric machine (e.g. third electric machine 49 at FIG. 1). Timeline 800 further includes plot 810, indicating torque provided by the first electric machine, which may be either positive (e.g. propulsive) torque (+), or negative (e.g. braking) torque (−) with respect to no torque (0) over time. Timeline 800 further includes plot 815, indicating torque provided by the third electric machine, which may be either positive (e.g. propulsive) torque (+), or negative (e.g. braking) torque (−) with respect to no torque (0) over time. Timeline 800 further includes plot 820, indicating vehicle speed, over time. The vehicle may be stationary (0), or its speed may be greater than (+) stopped. It may be understood that for this example timeline 800, vehicle speed pertains to the vehicle traveling in a forward, as opposed to a reverse, direction. Timeline 800 further includes plot 825, indicating a braking force requested, over time. There may be an absence of braking torque requested (0), or the braking force may be greater than (+) the absence of braking torque, over time. Timeline 800 further includes plot 830, indicating a level of force applied to front wheels via friction brakes, over time. There may be no friction brakes applied (0), or the force applied to the front wheels may be greater than (+) the absence of force applied. Similarly, timeline 800 includes plot 835, indicating a level of force applied to rear wheels via friction brakes, over time. Timeline 800 further includes plot 840, indicating whether the engine is operating (e.g. combusting air and fuel) (on), or is off, over time.

At time t0, the engine is off (plot 840), and the vehicle is stationary (plot 820). With the vehicle stationary, the first electric machine is not providing any torque (plot 810), and the third electric machine is not providing any torque either (plot 815). The vehicle is stationary, but braking is not currently being requested as the engine is off and torque is not being provided via the first or third electric machine. Accordingly, there is an absence of friction braking applied to both the front and rear wheels (plots 830 and 835, respectively). Furthermore, as of time t0 there is no degradation currently indicated associated with the first inverter (and while not specifically illustrated, there is no degradation currently indicated associated with the second inverter, either).

At time t1, the vehicle operator requests propulsive torque to propel the vehicle. The request may include the vehicle operator depressing the accelerator pedal, for example. The request is satisfied by the first electric machine providing positive torque to the front wheels of the vehicle, and vehicle speed increases accordingly. Between time t1 and t2, the engine is maintained off, and the third electric machine is not used for providing any positive torque to rear wheels.

At time t2, the engine is activated to combust air and fuel and provide additional propulsive torque. Accordingly, vehicle speed increases between time t2 and t3. However, between time t2 and t3 the actual torque provided via the first electric machine (plot 810) begins to differ from an expected torque (represented by line 811), and at time t3 positive torque production by the first electric machine fails. Accordingly, the difference (line 814) between expected torque (plot 811) and actual torque (plot 810) exceeds a threshold difference (represented by line 812), indicative of torque degradation. In this example timeline 800, it is determined that the issue stems from degradation of the first discharging circuit (D1). Accordingly, at time t3 use of the first electric machine as a motor is discontinued, and engine operation too is discontinued. While not explicitly illustrated, a DTC may be set via the controller and a MIL may be illuminated at the vehicle dash to alert the vehicle operator of a request to service the vehicle. Because the first discharging circuit is degraded, and due to the fact that there is no indication of degradation corresponding to the third electric machine, at time t3 the third electric machine is commanded to provide propulsive torque to the rear wheels, thereby avoiding a total vehicle shutdown and enabling the vehicle to continue being propelled via the third electric machine at a reduced speed between time t3 and t4. Line 816 represents a calibrated limit that the third electric machine may not exceed when the vehicle system is being operated in the fourth mitigation mode. It may be understood that the calibrated limit 816 may be a function of one or more of battery SOC, lateral stability considerations, battery temperature, third electric machine speed, etc. In some examples, the calibrated limit 816 may be adjusted based on one or more of the above-mentioned variables. In other words, calibrated limit 816 may be variable as a function of one or more operating conditions.

At time t4, vehicle deceleration is requested via the vehicle operator depressing the brake pedal, for example (plot 825). While the inverter function is degraded in terms of converting DC power to AC power, the inverter maintains its ability to convert AC power to DC power. Thus, the first electric machine can continue to be operated as a generator. Accordingly, to satisfy the braking request, the first electric machine provides a negative torque to the front wheels, and the third electric machine is recruited to provide a negative torque to the rear wheels. While not explicitly illustrated, it may be understood that the extent or magnitude of the negative torque provided via the first electric machine and the magnitude of the negative torque provided via the third electric machine may be selected as a function of a negative calibration limit 813 and negative calibration limit 817. Each of the negative calibration limit 813 and negative calibration limit 817 may be a function of one or more of battery SOC, lateral stability considerations, desired brake force distribution between front and rear axles, battery temperature, first electric machine speed, third electric machine speed, etc. It may be understood that the negative torque provided via the first electric machine and the third electric machine may not exceed negative calibration limit 813 or negative calibration limit 817, respectively. It may be further understood that each of negative calibration limit 813 and negative calibration limit 817 may in some examples be adjustable as a function of vehicle operating conditions, including but not limited to battery SOC, lateral stability considerations, desired brake force distribution between front and rear axles, battery temperature, first electric machine speed, third electric machine speed, etc.

Between time t4 and t5, the braking force requested is maintained substantially constant, and thus it may be understood that the vehicle operator is requesting the vehicle to decelerate to a standstill. With both the first electric machine and the third electric machine providing negative torque to front and rear wheels, respectively, vehicle speed decreases between time t4 and t5. The amount of negative torque provided to each of the front wheels and rear wheels is a function of a desired braking distribution between the front and rear axle. In other words, the magnitude of negative torque provided to each of the front and rear wheels may be selected so as to maintain a desired braking ratio between front and rear axles.

At time t5, while not explicitly illustrated it may be understood that vehicle speed has slowed to a point where regenerative braking is no longer effective in terms of recharging the battery, and accordingly, operation of the first and third electric machines is discontinued. To continue slowing the vehicle, friction brakes are applied to each of the front and rear wheels (see plots 830 and 835, respectively). Accordingly, the vehicle speed continues to decrease between time t5 and t6.

Thus, the prophetic example of FIG. 8 illustrates how the vehicle system may be operated in the fourth mitigation mode under circumstances where it is determined that torque degradation is due to the first inverter being unable to convert DC power to AC power, but where the first inverter maintains its ability to convert AC power to DC power. In such an example, rather than discontinuing operation of the vehicle responsive to the indication of the torque degradation, the third electric machine may be relied upon for providing propulsive torque to the rear wheels with the first electric machine deactivated (and the engine shut down). In response to a braking request, because the first electric machine can continue being operated as a generator, each of the first electric machine and the third electric machine may be operated in a regenerative braking mode where a magnitude of negative torque provided to each of the front and rear wheels may be controlled as a function of one or more of calibrated limits, desired braking distribution, lateral stability considerations, battery SOC, battery temperature, etc.

Turning now to FIG. 9, depicted is a prophetic example timeline 900 for controlling the vehicle system in the fifth mode of operation (refer to FIG. 5A and discussion thereof). Timeline 900 includes plot 905, indicating whether there is second inverter degradation (e.g. second inverter 65 at FIG. 1), over time. There may not be second inverter degradation (no), or the degradation may be specific to the second charging element (C2) (e.g. second charging element 69 at FIG. 1) or second discharging element (D2) (e.g. second discharging element 67 at FIG. 1). While not specifically illustrated at FIG. 9, it may be understood that there is no degradation associated with the first electric machine (e.g. first electric machine 40 at FIG. 1). Timeline 900 further includes plot 910, indicating torque provided by the first electric machine, which may be either positive (e.g. propulsive) torque (+), or negative (e.g. braking) torque (−) with respect to no torque (0) over time. Timeline 900 further includes plot 915, indicating torque provided by the third electric machine, which may be either positive (e.g. propulsive) torque (+), or negative (e.g. braking) torque (−) with respect to no torque (0) over time. Timeline 900 further includes plot 920, indicating vehicle speed, over time. The vehicle may be stationary (0), or its speed may be greater than (+) stopped. It may be understood that for this example timeline 900, vehicle speed pertains to the vehicle traveling in a forward, as opposed to a reverse, direction. Timeline 900 further includes plot 925, indicating a braking force requested, over time. There may be an absence of braking torque requested (0), or the braking force may be greater than (+) the absence of braking torque, over time. Timeline 900 further includes plot 930, indicating a level of force applied to front wheels via friction brakes, over time. There may be no friction brakes applied (0), or the force applied to the front wheels may be greater than (+) the absence of force applied. Similarly, timeline 900 includes plot 935, indicating a level of force applied to rear wheels via friction brakes, over time. Timeline 900 further includes plot 940, indicating whether the engine is operating (e.g. combusting air and fuel) (on), or is off, over time.

At time t0 the vehicle is being propelled via a combination of positive torque provided via the first electric machine to front wheels (plot 910) and engine operation to additionally provide torque to the front wheels (plot 940). As of time t0, there is no indication of torque degradation. The third electric machine is off (plot 915), and the vehicle is traveling at a speed that is a function of driver demand. There is no braking force requested at time t0 (plot 925), and accordingly there is no friction braking applied to front or rear wheels (refer to plots 930 and 935, respectively).

At time t0, the vehicle operator requests additional propulsive torque (not shown) and the controller allocates at least a portion of the request to the third electric machine. Accordingly, between time t2 and t3, the third electric machine provides positive propulsive torque to the rear wheels (plot 915). However, between time t2 and t3, actual torque provided via the third electric machine (plot 915) begins to differ from the expected torque commanded to the third machine (plot 916), and at time t3 the third electric machine can no longer provide positive torque. Accordingly, at time t3, the difference (see line 917) between expected torque (plot 916) and actual torque (plot 915) exceeds a threshold difference (represented by line 918), indicative of torque degradation. In this example timeline 900, it is determined that the issue stems from degradation of the second discharging circuit (D2). Accordingly, at time t3, use of the third electric machine as a motor is discontinued, but the vehicle can still be propelled via the first electric machine and engine (refer to plots 910 and 940, respectively). With the third electric machine deactivated in terms of providing positive torque to the rear wheels, vehicle speed declines slightly (plot 920). However, it may be understood that in other examples one or more of the engine and/or first electric machine may be used to maintain vehicle speed upon deactivation of the third electric machine. Between time t3 and t4, with the third electric machine deactivated, the vehicle is propelled via a combination of engine operation and positive torque provided to the front wheels from the first electric machine. The first electric machine is controlled to provide torque in a manner that does not exceed a positive calibration limit (represented by line 911) for the first electric machine. Similar to that discussed above, calibration limit 911 may be a function of one or more of battery SOC, battery temperature, lateral stability considerations, first electric machine speed, vehicle speed, etc. The positive calibration limit 911 may be adjusted as a function of operating conditions, including but not limited to the above-mentioned variables.

At time t4, vehicle deceleration is requested (plot 925). Because the torque degradation is specific to the second discharging circuit of the second inverter, the third electric machine may still be operated as a generator to convert AC power to DC power to increase battery SOC and provide regenerative braking capability to the rear axle. Accordingly, at time t4, the engine is deactivated (plot 940), and the first electric machine is commanded to provide a negative torque to the front wheels (plot 910) while the third electric machine is commanded to provide a negative torque to the rear wheels (plot 915). It may be understood that the magnitude of the negative torque provided via the first electric machine and the third electric machine may be selected so as to not exceed negative calibration limits corresponding to the first electric machine (represented by line 912) and the third electric machine (represented by line 919). It may be understood that the negative calibration limits may be a function of one or more of battery SOC, battery temperature, lateral stability considerations, desired braking distribution between the front axle and the rear axle, first electric machine speed, second electric machine speed, vehicle speed, etc. The magnitude of the negative torque provided to each of the front wheels and rear wheels may be adjusted as a function of desired braking distribution between front and rear axles, similar to that mentioned above, so that the desired braking distribution is maintained. With the first electric machine providing negative torque to front wheels and with the third electric machine providing negative torque to rear wheels, battery SOC increases and the vehicle slows (plot 920) between time t4 and t5. While not explicitly illustrated, after time t5 friction braking may be used to further slow the vehicle to a stop (along with discontinuing the providing of the negative torques to front and rear wheels) similar to that discussed above with regard to FIG. 8. Alternatively, after time t5 the vehicle operator may request acceleration, at which point the first electric machine may be commanded to provide positive propulsive torque to front wheels for meeting the acceleration request (alone or in combination with engine operation).

Thus, the prophetic example of FIG. 9 illustrates how the vehicle system may be operated in the fifth mitigation mode under circumstances where it is determined that a torque degradation is due to the second inverter being unable to convert DC power to AC power, but where the second inverter maintains its ability to convert AC power to DC power. In such an example, rather than discontinuing operation of the vehicle responsive to the indication of the torque degradation, the first electric machine (and engine in some examples) may continue to be relied upon for providing propulsive torque to the front wheels with the third electric machine deactivated. In response to a braking request, because the third electric machine can continue being operated as a generator, each of the first electric machine and the third electric machine may be operated in a regenerative braking mode where a magnitude of negative torque provided to each of the front and rear wheels may be controlled as a function of one or more of calibrated limits, desired braking distribution, lateral stability considerations, battery SOC, battery temperature, etc.

The prophetic example timelines of FIGS. 7-9 depict how the vehicle system may be controlled according to the third mitigation mode, fourth mitigation mode, and fifth mitigation mode. The prophetic example timelines were selected as providing examples of the concepts pertaining to how electric machines may be controlled in response to torque degradation being determined. For brevity, prophetic example timelines corresponding to mitigation modes 1-2 and mitigation mode 6 are not provided. However, similar principles apply to mitigation modes 1-2 and mitigation mode 6 as that of mitigation modes 3-4 shown at FIGS. 7-9, respectively, as discussed in detail above.

Discussed herein, a torque degradation event was described as degraded torque (e.g. erroneous torque) that may be selectively associated with a charging circuit (e.g. first charging circuit 47 at FIG. 1) or a discharging circuit (e.g. discharging circuit 45 at FIG. 1). Accordingly, turning now to FIG. 10 an example illustration of an inverter 1005, is shown, to highlight the aspects of the inverter which may be understood to be the charging circuit and discharging circuit. It may be understood that inverter 1005 may be the first inverter (e.g. first inverter 44 at FIG. 1) and/or the second inverter (e.g. second inverter 65 at FIG. 1). In other words, the inverters discussed herein with regard to FIGS. 1-9 may be of the type illustrated at FIG. 10.

Inverter 1005 is shown electrically coupled to electric energy storage device 46 (e.g., battery). In this example, electric energy storage device includes a plurality of battery cells 1033 that are connected in series to increase a voltage of electric energy device 46. Inverter 1005 is also shown being electrically coupled to electric machine 1040 (e.g., a three phase electric machine that may be operated as a motor or alternator). It may be understood that electric machine 1040 may be first electric machine 40 or third electric machine 49, for example.

Inverter 1005 includes a controller 1002 that may communicate with vehicle system controller 50 shown in FIG. 1 via controller area network (CAN) 52. Controller 1002 is electrically coupled to bases of transistors 1006, 1008, and 1010-1015. Controller 1002 may supply control signals to independently activate and deactivate transistors 1006, 1008, and 1010-1015. Controller 1002 includes inputs and outputs 2 (e.g., digital inputs, digital outputs, analog inputs, analog outputs), non-transitory memory 3 (e.g., read only or electrically erasable memory), and transitory memory 4. Controller 1002 may sense voltage at node 1003 and current flow through inductor 1004 via current sensor 1099.

Transistors 1006, 1008, and 1010-1015 are shown as insulated gate bipolar transistors (IGBT), but in alternative configurations, they may be metal oxide field effect transistors (MOSFETs), field effect transistors (FETs), or other known types of transistors. Controller 1002 may activate IGBTs via supplying a higher potential voltage to bases of transistors 1006, 1008, and 1010-1015. Controller 1002 may deactivate IGBTs via supplying a lower potential voltage to bases of transistors 1006, 1008, and 1010-1015. Bases of transistors 106 and 108 are indicted by the letters "B." Collectors of transistors 1006 and 1008 are indicated by letters "C." Emitters of transistors 1006 and 1008 are indicated by letters "E." Transistors 1010-1015 have similar bases, emitters, and collectors as indicated for transistors 1006 and 1008. Transistors 1006 and 1008 also include diodes 1007 and 1009, which are forward biased between the respective emitters and collectors. Current may flow between the collectors and the emitters of transistors 1006 and 1008 when they are activated. Current flow between the collectors and emitters of transistors 1006 and 1008 is prevented when transistors 1006 and 1008 are deactivated. Transistors 1010-1015 operate similarly. Transistors 1010-1015 may be selectively activated and deactivated to convert DC to AC.

Inductor 1004 is shown directly electrically coupled to transistors 1006 and 1008. Inductor 1004 is also directly electrically coupled to capacitor 1050, capacitor 1052, and electric energy storage device 46. Capacitor 1051 is shown electrically coupled to capacitor 1050 and a negative side of electric energy storage device 46.

In a boost mode, controller 1002 may selectively activate transistor 1008, which may be referred to as a boost transistor, to charge inductor 1004 via charge provided by electric energy storage device 46 from positive terminal 1033a. Inductor 1004 impedes current flow as it begins to store electric energy in a magnetic field. The polarity of the left hand side of inductor 1004 is positive when boost transistor 1008 is closed. Current flow through inductor 1004 is reduced and its magnetic field begins to collapse when boost transistor 1008 is opened. The polarity of inductor 1004 changes so that the right side of inductor 1004 has the positive polarity as its collapsing magnetic field supports continuing current flow to the load. The voltage of electric energy storage device 46 and the voltage developed across inductor 1004 are connected in series, thereby providing the voltage of electric energy storage device 46 plus the voltage of inductor 1004 at node 1080. The voltage at node 1080 less a small voltage drop across diode 1007 develops at node 1001, which is the output of the variable voltage control inverter boost circuit and input to transistors 1010-1015 when VVC is operating in a boost mode, since diode 1007 is forward biased. Charge may be stored in capacitor 1031 to smooth the output voltage of the boost circuit at node 1001. The voltage at node 1001 is a DC voltage. The variable voltage control inverter boost circuit may include capacitors 1050-1052, inductor 1004, boost transistor 1008, diode 1009, diode 1007, capacitor 1031, and resistor 1030. The voltage at node 1001 is supplied to transistors 1010-1015 which switch on and off to provide three phase AC power to electric machine 1040. Buck transistor 1006 is commanded deactivated whenever boost transistor 1008 is commanded activated so as to prevent short circuiting between node 1001 and node 1081.

If only a small amount of power is requested of electric machine 1040, battery voltage minus small voltage drops for inductor 1004 and diode 1007 may be supplied at node 1001 by deactivating buck transistor 1006 and boost transistor 1008.

In a buck mode, charge is supplied to inductor 1004 via electric machine 1040. In particular, three phase AC output of electric machine is converted into a DC voltage at node 1001 via switching of transistors 1010-1015 by controller 1002. Inductor 1004 is charged via activating transistor 1006, which may be referred to as a buck transistor. Inductor 1004 impedes current flow as it begins to store electric energy in a magnetic field. The polarity of the right hand side of inductor 1004 is positive when boost transistor 1006 is closed. Current flow through inductor 1004 is reduced and its magnetic field begins to collapse when buck transistor 1006 is opened. The polarity of inductor 1004 changes so that the left side of inductor 1004 has the positive polarity as its collapsing magnetic field supports continuing current flow to the load (e.g., electric energy storage device 46). The amount of time inductor 1004 is allowed to charge is controlled so that voltage that develops across inductor 1004 is less than voltage output via the electric machine 1040. Diode 1009 couples the right side of inductor 1004 to node 1081, which is coupled to negative battery terminal 1033b. The voltage developed across inductor 1004 is connected to positive terminal 1033a of electric energy storage device 46. Charge from inductor 1004 flows to terminal 1033a so that the electric energy storage device may charge. The voltage at node 1003 is controlled via adjusting the amount of time buck transistor 1006 is activated (e.g., closed to allow current flow through the transistor). Boost transistor 1008 is deactivated (e.g., opened to inhibit current flow through the transistor) whenever buck transistor 1006 is activated. Charge may be stored in capacitors 1050-1052 to smooth the output voltage of the buck circuit at node 1003. The voltage at node 1003 is a DC voltage. The variable voltage control inverter buck circuit may include capacitors 1050-1052, inductor 1004, buck transistor 1006, diode 1009, capacitor 1031, and resistor 1030. Voltage and node 1003 is the output voltage of the variable voltage control inverter buck circuit. Controller 1002 may monitor voltages at nodes 1003 and 1001. Further, controller 1002 may adjust the duty cycle of signals supplied to boost transistor 1008 and buck transistor 1006 responsive to voltages at nodes 1003 and 1001.

Thus, it may be understood based on the description above with regard to FIG. 10 that in a case where boost transistor 1008 is degraded, then the inverter may not be able to convert DC power to AC power, but provided that buck transistor 1006 remains functional, then the inverter may continue to be able to convert AC power to DC power for storage at the battery. Accordingly, the discharging circuit (e.g. first discharging circuit 45 at FIG. 1) may be understood to be boost transistor 1008, for example, and the charging circuit (e.g. first charging circuit 47 at FIG. 1) may be understood to be buck transistor 1006, for example.

In this way, in response to erroneous torque being delivered to one of a vehicle's axles, where the erroneous torque is associated with an electric machine, control strategy may adjust or discontinue altogether use of the electric machine that is producing the erroneous torque, and may in turn employ another electric machine mechanically coupled to another axle.

The technical effect of accounting for an origin of a torque degradation event (e.g. whether the torque degradation is associated with an electric machine mechanically coupled to the front axle or another electric machine mechanically coupled to the rear axle), is that a vehicle shutdown event may be avoided. By avoiding a shutdown event, customer satisfaction may be improved, and appropriate mitigating action may be taken to address the issue of the origin of the torque degradation. A further technical effect of accounting for the origin of the torque degradation is that it may be possible to determine whether the torque degradation is specific to an ability of an electric machine to generate propulsive torque or regenerative torque. In a case where the torque degradation is determined to adversely impact an electric machine's ability to deliver propulsive torque, but not regenerative torque, then said electric machine may continue to be operated in a regenerative mode, but not a propulsive mode. Similarly, in a case where the torque degradation is determined to adversely impact an electric machine's ability to deliver regenerative torque, but not propulsive torque, then said electric machine may continue to be operated in a propulsive mode, but not a regenerative mode.

The systems and methods discussed herein may enable one or more systems and one or more methods. In one example, a method comprises propelling a vehicle at least in part via a first electric machine that provides torque to front wheels and/or via a second electric machine that provides torque to rear wheels of the vehicle, where the front wheels selectively receive torque from an engine; and responsive to an indication of a torque degradation event, adjusting operation of both the first and the second electric machine, and continuing to propel the vehicle. In a first example of the method, the method further includes wherein the torque degradation event includes an indication that an actual wheel torque differs from an expected wheel torque by more than a threshold torque difference for a period of time. A second example of the method optionally includes the first example, and further comprises deactivating the first electric machine under conditions where the torque degradation event is associated with torque provided to the front wheels of the vehicle via the first electric machine. A third example of the method optionally includes any one or more or each of the first through second examples, and further comprises adjusting output of the second electric machine when the torque degradation event is associated with torque provided to the front wheels of the vehicle, the adjusting including providing a continuously variable rear wheel torque to the rear wheels via the second electric machine as a function of lateral stability of the vehicle. A fourth example of the method optionally includes any one or more or each of the first through third examples, and further comprises providing negative torque to the rear wheels via the second electric machine in response to a request to decelerate the vehicle; and maintaining a desired braking distribution between the front wheels and the rear wheels via friction braking of the front wheels. A fifth example of the method optionally includes any one or more or each of the first through fourth examples, and further comprises discontinuing or maintaining discontinued operation of the engine responsive to the torque degradation event being associated with torque provided to the front wheels of the vehicle. A sixth example of the method optionally includes any one or more or each of the first through fifth examples, and further comprises deactivating the second electric machine under conditions where the torque degradation event is associated with torque provided to the rear wheels of the vehicle via the second electric machine. A seventh example of the method optionally includes any one or more or each of the first through sixth examples, and further comprises adjusting output of the first electric machine when the torque degradation event is associated with torque provided to the rear wheels of the vehicle, the adjusting including providing a continuously variable front wheel torque to the front wheels via the first electric machine as a function of lateral stability of the vehicle. An eighth example of the method optionally includes any one or more or each of the first through seventh examples, and further comprises providing negative torque to the front wheels via the first electric machine in response to a request to decelerate the vehicle; and maintaining a desired braking distribution between the front wheels and the rear wheels via friction braking of the rear wheels. A ninth example of the method optionally includes any one or more or each of the first through eighth examples, and further comprises providing torque to the front wheels via the engine responsive to deactivating the second electric machine under conditions where the first electric motor cannot meet a driver demanded wheel torque.

An example of a powertrain method comprises evaluating a first electric machine that provides propulsive effort to a first axle and a second electric machine that provides propulsive effort to a second axle for torque output degradation; deactivating one of the first electric machine or the second electric machine in response to an indication of torque output degradation; and limiting torque output of the other of the first electric machine or the second electric machine according to the deactivation of the one of the first electric machine or the second electric machine. In a first example of the method, the method further comprises monitoring a lateral stability of the vehicle in response to deactivating one of the first electric machine or the second electric machine; and wherein limiting torque output of the other of the first electric machine or the second electric machine is based on the lateral stability of the vehicle. A second example of the method optionally includes the first example, and further comprises limiting regenerative braking of the other of the first electric machine or the second electric machine in response to the deactivation of the one of the first electric machine or the second electric machine. A third example of the method optionally includes any one or more or each of the first through second examples, and further includes wherein limiting regenerative braking is based on a desired braking distribution between the first axle and the second axle; and wherein the desired braking distribution is maintained via the use of friction braking on wheels coupled to whichever axle is associated with a deactivated electric machine.

An example of a system for a hybrid electric vehicle comprises a first electric machine that provides propulsive effort to a first axle; a second electric machine that provides propulsive effort to a second axle; and a controller with computer readable instructions stored on non-transitory memory that when executed, cause the controller to: indicate a torque degradation event associated with the first electric machine and/or the second electric machine; and in response to the torque degradation event being indicated, adjust operation of both the first electric machine and the second electric machine in order to continue propelling the hybrid electric vehicle. In a first example of the system, the system further includes wherein adjusting operation of both the first electric machine and the second electric machine includes deactivating one of the first electric machine or the second electric machine; and limiting torque output of the other of the first electric machine or the second electric machine according to the deactivation of the one of the first electric machine or the second electric machine. A second example of the system optionally includes the first example, and further comprises a first inverter electrically coupled to the first electric machine; and wherein the controller stores further instructions to, in response to the torque degradation event being due to the first inverter being degraded in its ability to convert direct current to alternating current but not in its ability to convert alternating current to direct current, rely on the first electric machine for regenerative braking but not propulsive effort, and limit both propulsive torque output and regenerative torque of the second electric machine. A third example of the system optionally includes the first example, and further includes wherein the controller stores further instructions to, in response to the torque degradation event being due to the first inverter being degraded in its ability to convert alternating current to direct current but not in its ability to convert direct current to alternating current, rely on the first electric machine for propulsive effort but not regenerative braking, and limit both propulsive torque output and regenerative torque of the second electric machine. A fourth example of the system optionally includes any one or more or each of the first through third examples, and further comprises a second inverter electrically coupled to the second electric machine; and wherein the controller stores further instructions to, in response to the torque degradation event being due to the second inverter being degraded in its ability to convert direct current to alternating current but not in its ability to convert alternating current to direct current, rely on the second electric machine for regenerative braking but not propulsive effort, and limit both propulsive torque output and regenerative torque of the first electric machine. A fifth example of the system optionally includes any one or more or each of the first through fourth examples, and further includes wherein the controller stores further instructions to, in response to the torque degradation event being due to the second inverter being degraded in its ability to convert alternating current to direct current but not in its ability to convert direct current to alternating current, rely on the second electric machine for propulsive effort but not regenerative braking, and limit both propulsive torque output and regenerative torque of the first electric machine.

In another representation, a method comprises indicating that an inverter coupled to an electric machine that is in turn mechanically coupled to an axle of a vehicle is degraded in its ability to convert direct current to alternating current, but not in its ability to convert alternating current to direct current. Responsive to the indicating, the method includes operating the electric machine in a regenerative mode in response to braking requests, but preventing operation of the electric machine in a propulsive mode in response to propulsion requests. In another example where the inverter is degraded in its ability to convert alternating current to direct current, but not in its ability to convert direct current to alternating current, the method may include operating the electric machine in the propulsive mode but not the regenerative mode. In an example where the inverter is degraded in its ability to convert direct current to alternating current, but not in its ability to convert alternating current to direct current, the inverter may include a degraded boost transistor an a non-degraded buck transistor. In an example where the inverter is degraded in its ability to convert alternating current to direct current, but not in its ability to convert direct current to alternating current, the inverter may include a degraded buck transistor and a non-degraded boost transistor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
propelling a vehicle at least in part via a first electric machine that provides torque to front wheels and/or via a second electric machine that provides torque to rear wheels of the vehicle, where the front wheels selectively receive torque from an engine;
generating an indication of a torque degradation event based on a determination that an actual wheel torque differs from an expected wheel torque by more than a threshold torque difference for a period, including determining whether an inverter coupled to one of the first and second electric machines is degraded in its ability to convert alternating current to direct current but not in its ability to convert direct current to alternating current; and
responsive to the indication of the torque degradation event, adjusting operation of both the first and the second electric machine, and continuing to propel the vehicle, including utilizing the first electric machine for propulsive effort but not regenerative braking, and limiting both propulsive torque output and regenerative torque of the second electric machine but still propelling the vehicle with the second electric machine.

2. The method of claim 1, further comprising deactivating the first electric machine under conditions where the torque degradation event is associated with torque provided to the front wheels of the vehicle via the first electric machine.

3. The method of claim 2, further comprising adjusting output of the second electric machine when the torque degradation event is associated with torque provided to the front wheels of the vehicle, the adjusting including providing a continuously variable rear wheel torque to the rear wheels via the second electric machine.

4. The method of claim 3, further comprising providing negative torque to the rear wheels via the second electric machine in response to a request to decelerate the vehicle; and
maintaining a desired braking distribution between the front wheels and the rear wheels via friction braking of the front wheels.

5. The method of claim 2, further comprising discontinuing or maintaining discontinued operation of the engine responsive to the torque degradation event being associated with torque provided to the front wheels of the vehicle.

6. The method of claim 1, further comprising deactivating the second electric machine under conditions where the torque degradation event is associated with torque provided to the rear wheels of the vehicle via the second electric machine.

7. The method of claim 6, further comprising adjusting output of the first electric machine when the torque degradation event is associated with torque provided to the rear wheels of the vehicle, the adjusting including providing a continuously variable front wheel torque to the front wheels via the first electric machine.

8. The method of claim 7, further comprising providing negative torque to the front wheels via the first electric machine in response to a request to decelerate the vehicle; and
maintaining a desired braking distribution between the front wheels and the rear wheels via friction braking of the rear wheels.

9. The method of claim 6, further comprising providing torque to the front wheels via the engine responsive to deactivating the second electric machine under conditions where the first electric motor cannot meet a driver demanded wheel torque.

10. A powertrain method for a vehicle comprising:
evaluating a first electric machine that provides propulsive effort to a first axle and a second electric machine that provides propulsive effort to a second axle and determining wheel torque output degradation;
in response to the wheel torque output degradation being due to a first inverter coupled to the first electric machine being degraded in its ability to convert alternating current to direct current but not in its ability to convert direct current to alternating current, utilizing the first electric machine for propulsive effort but not regenerative braking, and limiting both propulsive torque output and regenerative torque of the second electric machine, including still propelling the vehicle with the second electric machine.

11. The powertrain method of claim 10, further comprising monitoring a lateral stability of the vehicle in response to deactivating one of the first electric machine or the second electric machine.

12. The powertrain method of claim 10, wherein the limiting regenerative torque is based on a desired braking distribution between the first axle and the second axle; and
    wherein the desired braking distribution is maintained via the use of friction braking on wheels coupled to an axle that is associated with a deactivated electric machine.

13. A system for a hybrid electric vehicle, comprising:
    a first electric machine that provides propulsive effort to a first axle;
    a second electric machine that provides propulsive effort to a second axle;
    a first inverter electrically coupled to the first electric machine; and
    a controller with computer readable instructions stored on non-transitory memory that when executed, cause the controller to:
    determine a torque degradation event associated with the first electric machine and/or the second electric machine;
    in response to the torque degradation event being indicated, adjust operation of both the first electric machine and the second electric machine in order to continue propelling the hybrid electric vehicle, and
    in response to the torque degradation event being due to the first inverter being degraded in its ability to convert alternating current to direct current but not in its ability to convert direct current to alternating current, utilize the first electric machine for propulsive effort but not regenerative braking, and limit both propulsive torque output and regenerative torque of the second electric machine.

14. The system of claim 13, wherein the controller stores further instructions to, in response to the torque degradation event being due to the first inverter being degraded in its ability to convert direct current to alternating current but not in its ability to convert alternating current to direct current, rely on the first electric machine for regenerative braking but not propulsive effort, and limit both propulsive torque output and regenerative torque of the second electric machine.

15. The system of claim 13, further comprising a second inverter electrically coupled to the second electric machine; and
    wherein the controller stores further instructions to, in response to the torque degradation event being due to the second inverter being degraded in its ability to convert direct current to alternating current but not in its ability to convert alternating current to direct current, utilize the second electric machine for regenerative braking but not propulsive effort, and limit both propulsive torque output and regenerative torque of the first electric machine.

16. The system of claim 15, wherein the controller stores further instructions to, in response to the torque degradation event being due to the second inverter being degraded in its ability to convert alternating current to direct current but not in its ability to convert direct current to alternating current, utilize the second electric machine for propulsive effort but not regenerative braking, and limit both propulsive torque output and regenerative torque of the first electric machine.

* * * * *